United States Patent
Shen et al.

(10) Patent No.: US 12,422,732 B2
(45) Date of Patent: Sep. 23, 2025

(54) TWO-PHOTON QUANTUM PHOTONIC LOGIC GATES

(71) Applicant: Washington University, St. Louis, MO (US)

(72) Inventors: Jung-Tsung Shen, St. Louis, MO (US); Yao Zhou, St. Louis, MO (US); Zihao Chen, St. Louis, MO (US)

(73) Assignee: Washington University, St. Louis, MO (US)

( * ) Notice: Subject to any disclaimer, the term of this patent is extended or adjusted under 35 U.S.C. 154(b) by 796 days.

(21) Appl. No.: 17/561,556

(22) Filed: Dec. 23, 2021

(65) Prior Publication Data

US 2022/0206361 A1    Jun. 30, 2022

Related U.S. Application Data

(60) Provisional application No. 63/130,112, filed on Dec. 23, 2020.

(51) Int. Cl.
*G02F 3/00* (2006.01)
*G06N 10/20* (2022.01)

(52) U.S. Cl.
CPC .............. *G02F 3/00* (2013.01); *G06N 10/20* (2022.01)

(58) Field of Classification Search
CPC ........... G02F 3/00; G06N 10/20; G06N 10/40
USPC ......................................................... 359/108
See application file for complete search history.

(56) References Cited

U.S. PATENT DOCUMENTS

| | | | |
|---|---|---|---|
| 8,135,276 B2 | 3/2012 | Munro et al. | |
| 8,294,967 B2 | 10/2012 | Langford et al. | |
| 11,361,822 B2* | 6/2022 | Brown | G11C 13/06 |
| 11,715,521 B2* | 8/2023 | Brown | H04B 10/29 |
| 2016/0245639 A1 | 8/2016 | Mower et al. | |

(Continued)

OTHER PUBLICATIONS

Quantum Networks with Chiral-Light-Matter Interaction in Waveguides, Sahand Mahmoodian, Peter Lodahl, and Anders S. Sørensen, Phys. Rev. Lett. 117, 240501—Published Dec. 5, 2016 (Year: 2016).*

(Continued)

*Primary Examiner* — William R Alexander

(57) ABSTRACT

Photonic controlled-phase gates that include a dipole emitter chirally coupled to a plurality of photonic qubit pairs in a waveguide are disclosed herein. Each photonic qubit pair includes a two-qubit state $|xy\rangle$, wherein the two-qubit state $|xy\rangle$ comprises a combination of single-qubit states $|0\rangle$ and $|1\rangle$, and may be $|00\rangle$, $|01\rangle$, $|10\rangle$, and $|11\rangle$. The dipole emitter is configured to interact with the single-qubit state $|0\rangle$ to impose a $\pi$ phase shift, and the dipole emitter interacts with states $|00\rangle$, $|01\rangle$, and $|10\rangle$ to impose the $\pi$ phase shift.

17 Claims, 17 Drawing Sheets
(17 of 17 Drawing Sheet(s) Filed in Color)

(56) References Cited

U.S. PATENT DOCUMENTS

| | | |
|---|---|---|
| 2017/0261835 A1 | 9/2017 | Koehl et al. |
| 2020/0152268 A1* | 5/2020 | Brown .................. H04B 10/29 |
| 2022/0270684 A1* | 8/2022 | Brown .................. H04B 10/29 |

OTHER PUBLICATIONS

Nysteen A. et al. (2017) Limitations of two-level emitters as nonlinearities in two-photon controlled-PHASE gates. Physical Review A. Vol. 95, No. 062304, p. 1.

Zheng H. (2013) Interacting Photons in Waveguide-QED and Applications in Quantum Information Processing. PhD Thesis, Duke University, Department of Physics, p. 1-203.

Chen Z. (2019) Quantum Nanophotonics: Deterministic Photon-based Quantum Logic Gate By Exploiting Few-photon Nonlinearity. Engineering and Applied Science Theses & Dissertations. vol. 471, p. 1-113.

Chen Z. (2019) Deterministic two-photon controlled phase gate by exploiting nonlinear pi-phase shift in photonic molecule generations. Proc. SPIE 10933, Advances in Photonics of Quantum Computing, Memory, and Communication XII, vol. 109330C.

* cited by examiner

TWO-PHOTON QUANTUM PHOTONIC LOGIC GATES

CROSS-REFERENCE TO RELATED APPLICATIONS

This application claims the benefit of priority to U.S. Provisional Application Ser. No. 63/130,112 filed on Dec. 23, 2020, the content of which is incorporated herein by reference in its entirety.

STATEMENT REGARDING FEDERALLY SPONSORED RESEARCH OR DEVELOPMENT

Not applicable.

FIELD OF THE DISCLOSURE

The present disclosure generally relates to devices and methods of optical quantum computing, and in particular, the present disclosure relates to deterministic two-qubit photonic controlled-phase (controlled-Z) gates.

BACKGROUND OF THE DISCLOSURE

Photons are appealing as flying quantum bits due to their low-noise, long coherence times, light-speed transmission, and ease of manipulation at the single-qubit level using standard optical components such as beam splitters and waveguides. The challenge in optical quantum information processing has been the realization of two-qubit gates for photonic qubits due to the lack of highly efficient optical Kerr nonlinearities at the single-photon level. To date, only probabilistic two-qubit photonic controlled-phase gates based on linear optics and projective measurement using photon detectors have been demonstrated.

Quantum information science exploits quantum mechanical phenomena such as superposition and entanglement to improve classical communication, information processing, computation, and precision measurement. In quantum information processing, single-qubit operations are not sufficient to unlock all the computational power that is endowed by a collection of qubits. Quantum computation comprised of only single-quantum bit (qubit) operations can be efficiently simulated by classical architecture. Hence it is necessary and sufficient to add a two-qubit gate such as a controlled-phase (C-Phase) gate or its equivalent controlled-NOT (C-NOT) gate to a finite set of single-qubit gates to achieve what no longer can be efficiently simulated on a classical computer. Among all possible physical realizations, optical quantum information science, where photons are used as flying qubits, has attracted significant attention. Photons are appealing for their low-noise, long coherence times, light-speed transmission, and ease of manipulation at the single-qubit level using standard optical components such as beam splitters and waveguides. Photons also allow the encoding of information in various degrees of freedom. The temporal evolution of the quantum state of photonic qubits is governed by a unitary operator acting on the quantum states, where the Hamiltonian describing the quantum system is exponentiated, $U(t_f, t_i) = \mathcal{T} \exp[-i/\hbar \int_{t_i}^{t_f} H(t)dt]$ and thus the evolution is reversible.

In quantum information processing, single-qubit operations are not sufficient to unlock all the computational power that is endowed by a collection of qubits. Quantum computation comprising of only single-qubit operations can be efficiently simulated by classical architecture. Hence it is necessary and sufficient to add a two-qubit gate such as a controlled-phase gate or its equivalent controlled-NOT gate to a finite set of single-qubit gates to achieve what no longer can be efficiently simulated on a classical computer (e.g., Shor's factoring algorithm which facilitates the factorization of large numbers into their prime factors in polynomial time on a quantum computer, and Grover's algorithm which enables searching in an unordered list with a quadratic speedup compared to the classical case). The controlled-phase gate performs a conditional sign flip defined by $|x\rangle|y\rangle \rightarrow (-1)^{x \cdot y}|x\rangle|y\rangle$ where x, y=0,1. One can show that an arbitrary unitary matrix U on a d-dimensional Hilbert space can be decomposed into a product of d two-level matrices (i.e., matrices acting non-trivially on only two or fewer qubits). Standard universal sets of quantum logic gates include, for example, {controlled-phase, Hadamard, and suitable phase flips} for continuous gates, and {controlled-phase, Hadamard, X, and T($\pi/8$)} for discrete gates.

The challenge in optical quantum information processing has been the realization of two-qubit photonic gates due to the lack of highly efficient optical Kerr nonlinearities at the single-photon level. Even in natural nonlinear optical media, in which two light beams can interact because of their influence on the medium's refractive index, photons rarely interact, and such interactions are prohibitively weak at typical light levels.

To overcome this hurdle, in a breakthrough, Knill, Laflamme, and Milburn (KLM) showed that such an efficient nonlinearity can be achieved using only linear optical elements, auxiliary photons, and projective measurement. Although subsequent developments have reduced the complexity in the measurement-based and teleportation-based KLM protocol such that linear optical quantum computing (LOQC) has become one of the leading candidates for the implementation of large-scale universal quantum computation, the technological requirements such as fast feed-forward and optical quantum memory remain extremely challenging. To date, only probabilistic two-qubit photonic logic gates based on linear optics and projective measurements using photon detectors have been realized.

To date, only probabilistic two-qubit photonic logic gates based on linear optics and projective measurements using photon detectors could be realized. The implementation of probabilistic two-qubit photonic logic gates, however, is associated with substantial resource overhead and stringent technological demands which remain challenging.

To overcome this hurdle, in a breakthrough, Knill, Laflamme, and Milburn (KLM) showed that such an efficient nonlinearity can be achieved using only linear optical elements, auxiliary photons, and projective measurement; specifically, a heralded probabilistic controlled-phase gate can be realized by using extra 'ancilla' photons—photons that are not part of the computation and single-photon detection. Although subsequent developments have reduced the complexity in the measurement-based and teleportation-based KLM protocol such that linear optical quantum computing (LOQC) has become one of the leading candidates for the implementation of large-scale universal quantum computation, the technological requirements such as fast feed-forward and optical quantum memory remain extremely challenging. The implementation of a KLM controlled-phase gate requires a variety of complex elements including single-photon sources with stringent mode and bandwidth characteristics, high-efficiency number-resolving single-photon detectors, and complicated optical circuits exhibiting both classical and quantum interference effects.

Simpler and more technologically achievable, but non-universal, quantum computation approaches have been proposed for carrying out one fixed task probabilistically. The boson-sampling model was proposed to address a potential limitation in LOQC, namely that the operation of a passive linear optics interferometer with Fock state inputs is unlikely to be accurately simulated by a classical computer.

SUMMARY

In one aspect, a photonic controlled-phase gate that includes a dipole emitter chirally coupled to a plurality of photonic qubit pairs in a waveguide is disclosed. Each photonic qubit pair comprising a two-qubit state $|xy\rangle$, in which the two-qubit state $|xy\rangle$ includes a combination of single-qubit states $|0\rangle$ and $|1\rangle$, the state selected from the group consisting of $|00\rangle$, $|01\rangle$, $|10\rangle$, and $|11\rangle$; the dipole emitter is configured to interact with the single-qubit state $|0\rangle$ to impose a $\pi$ phase shift; and the dipole emitter interacts with states $|00\rangle$, $|01\rangle$, and $|10\rangle$ to impose the $\pi$ phase shift. In some aspects, the waveguide is selected from a photonic crystal waveguide, a nanobeam waveguide, and a chiral waveguide. In some aspects, the waveguide is selected from a photonic crystal waveguide, a nanobeam waveguide, and a chiral waveguide. In some aspects, the dipole emitter is selected from a Rydberg atom, a quantum dot, a superconducting qubit, and an N—V defect state in a single-walled carbon nanotubes. In some aspects, the quantum dot is an InGaAs quantum dot. In some aspects, the dipole emitter is a circularly polarized dipole emitter chirally coupled to a circularly polarized electric field of the photonic crystal waveguide, in which the single-qubit state $|0\rangle$ is a photon with helicity $\sigma_+$ and transition frequency $\omega_+$ and the single-qubit state $|1\rangle$ is a photon with helicity $\sigma_-$ and transition frequency $\omega_+$; or the single-qubit state $|0\rangle$ is a photon with helicity $\sigma_+$ and transition frequency $\omega_+$ and the single-qubit state $|1\rangle$ is a photon with helicity $\sigma_+$ and transition frequency $\omega_-$. In some aspects, the dipole emitter is a horizontally linearly-polarized dipole emitter coupled to a horizontal/vertical linearly-polarized electric field of the chiral waveguide, in which the single-qubit state $|0\rangle$ is a horizontally-polarized photon with transition frequency $\omega_+$ and the single-qubit state $|1\rangle$ is a vertically-polarized photon with transition frequency $\omega_+$; or the dipole emitter is a horizontally linearly-polarized dipole emitter coupled to a horizontal/vertical linearly-polarized electric field of the chiral waveguide, the single-qubit state $|0\rangle$ is a horizontally-polarized photon with transition frequency $\omega_+$ and the single-qubit state $|1\rangle$ is a horizontally-polarized photon with transition frequency $\omega_-$. In some aspects, the dipole emitter interacts with state $|00\rangle$ to form a photonic dimer.

In another aspect, a two-qubit photonic controlled-phase gate device, that includes first and second chiral waveguides, each containing first and second dipole emitters is disclosed. The first chiral waveguide is operatively coupled at opposite ends to a first input waveguide and a first output waveguide and the second chiral waveguide is operatively coupled at opposite ends to a second input waveguide and a second output waveguide. The first input waveguide is operatively coupled to a first qubit source and the second input waveguide is operatively coupled to a second qubit source. The first input waveguide and the second input waveguide are operatively coupled to an input beam combiner positioned between the first and second qubit sources and the first and second chiral waveguides. The first output waveguide and the second output waveguides are further operatively coupled to first and second frequency domain modulators and first and second photodetectors at ends opposite the first and second chiral waveguides, respectively. The first and second dipole emitters are chirally coupled to a plurality of photonic qubit pairs produced by the first and second qubit sources, respectively, each photonic qubit pair comprising a two-qubit state $|xy\rangle$, wherein each two-qubit state $|xy\rangle$ comprises a combination of single-qubit states $|0\rangle$ and $|1\rangle$, the state selected from the group consisting of $|00\rangle$, $|01\rangle$, $|10\rangle$, and $|11\rangle$; the dipole emitter is configured to interact with each single-qubit state $|0\rangle$ to impose a $\pi$ phase shift; and the dipole emitter interacts with states $|00\rangle$, $|01\rangle$, and $|10\rangle$ to impose the $\pi$ phase shift. In some aspects, the first and second chiral waveguides are selected from a photonic crystal waveguide, a nanobeam waveguide, and a chiral waveguide. In some aspects, the photonic crystal waveguide comprises a glide plane structure and the dipole emitter is positioned at a chiral point of the photonic crystal waveguide. In some aspects, the dipole emitter is selected from a Rydberg atom, a quantum dot, a superconducting qubit, and an N—V defect state in a single-walled carbon nanotubes. In some aspects, the quantum dot is an InGaAs quantum dot. In some aspects, the dipole emitter is a circularly polarized dipole emitter chirally coupled to a circularly polarized electric field of the photonic crystal waveguide, in which the single-qubit state $|0\rangle$ is a photon with helicity $\sigma_+$ and transition frequency $\omega_+$ and the single-qubit state $|1\rangle$ is a photon with helicity $\sigma_-$ and transition frequency $\omega_+$; or the single-qubit state $|0\rangle$ is a photon with helicity $\sigma_+$ and transition frequency $\omega_+$ and the single-qubit state $|1\rangle$ is a photon with helicity $\sigma_+$ and transition frequency $\omega_-$. In some aspects, the dipole emitter is a horizontally linearly-polarized dipole emitter coupled to a horizontal/vertical linearly-polarized electric field of the chiral waveguide, in which the single-qubit state $|0\rangle$ is a horizontally-polarized photon with transition frequency $\omega_+$ and the single-qubit state $|1\rangle$ is a vertically-polarized photon with transition frequency $\omega_+$; or the dipole emitter is a horizontally linearly-polarized dipole emitter coupled to a horizontal/vertical linearly-polarized electric field of the chiral waveguide, the single-qubit state $|0\rangle$ is a horizontally-polarized photon with transition frequency $\omega_+$ and the single-qubit state $|1\rangle$ is a horizontally-polarized photon with transition frequency $\omega_-$. In some aspects, the dipole emitter interacts with state $|00\rangle$ to form a photonic dimer. In some aspects, at least one of the first and second photodetectors comprises a superconducting wire detector, the superconducting wire detector configured to specifically detect photonic qubit pairs with the two-qubit state $|00\rangle$.

In another aspect, a two-qubit photonic controlled-phase gate device is disclosed that includes a first waveguide comprising a first input port, a first exit port, and a first controlled-phase gate optically coupled to the first waveguide between the first input port and the first exit port; and a second waveguide comprising a second input port, a second exit port, and a second controlled-phase gate optically coupled to the second waveguide between the second input port and the second exit port. The first and second input ports are configured to receive a first and second photonic qubit, each photonic qubit comprising one of single-qubit states $|0\rangle$ and $|1\rangle$. The first and second input ports are optically coupled by a first 50:50 coupler and the first and second exit ports are optically coupled by a second 50:50 coupler. The first 50:50 coupler is configured to transform the single-qubit states of the first and second photonic qubits to produce first and second two-qubit states selected from $|00\rangle$, $|01\rangle$, $|10\rangle$, and $|11\rangle$. Each of the first and second controlled-phase gates comprises a dipole emitter chirally coupled to the plurality of photonic qubits in a gate waveguide, the dipole emitter configured to interact with the single-qubit state $|0\rangle$. each dipole emitter interacts with two-qubit states $|00\rangle$, $|01\rangle$, and $|10\rangle$ to impose a $\pi$ phase shift. In some aspects, the single-qubit states of the first and second photonic qubits entering the first and second input ports respectively are transformed into third and fourth photonic qubits exiting the first and second exit ports with single-qubit states as expressed in the table:

| First/Second Input Ports | First/Second Exit Ports |
|---|---|
| $|1\rangle|1\rangle$ | $|1\rangle|1\rangle$ |
| $|0\rangle|1\rangle$ | $-|0\rangle|1\rangle$ |
| $|1\rangle|0\rangle$ | $-|1\rangle|0\rangle$ |
| $|0\rangle|0\rangle$ | $-|0\rangle|0\rangle$ | wherein a (−) sign denotes the $\pi$ phase shift.

Additional aspects of the disclosure are provided herein.

DESCRIPTION OF THE DRAWINGS

The patent or application file contains at least one drawing executed in color. Copies of this patent or patent application publication with color drawing(s) will be provided by the Office upon request and payment of the necessary fee.

Those of skill in the art will understand that the drawings described below are for illustrative purposes only. The drawings are not intended to limit the scope of the present teachings in any way.

Figure 1:
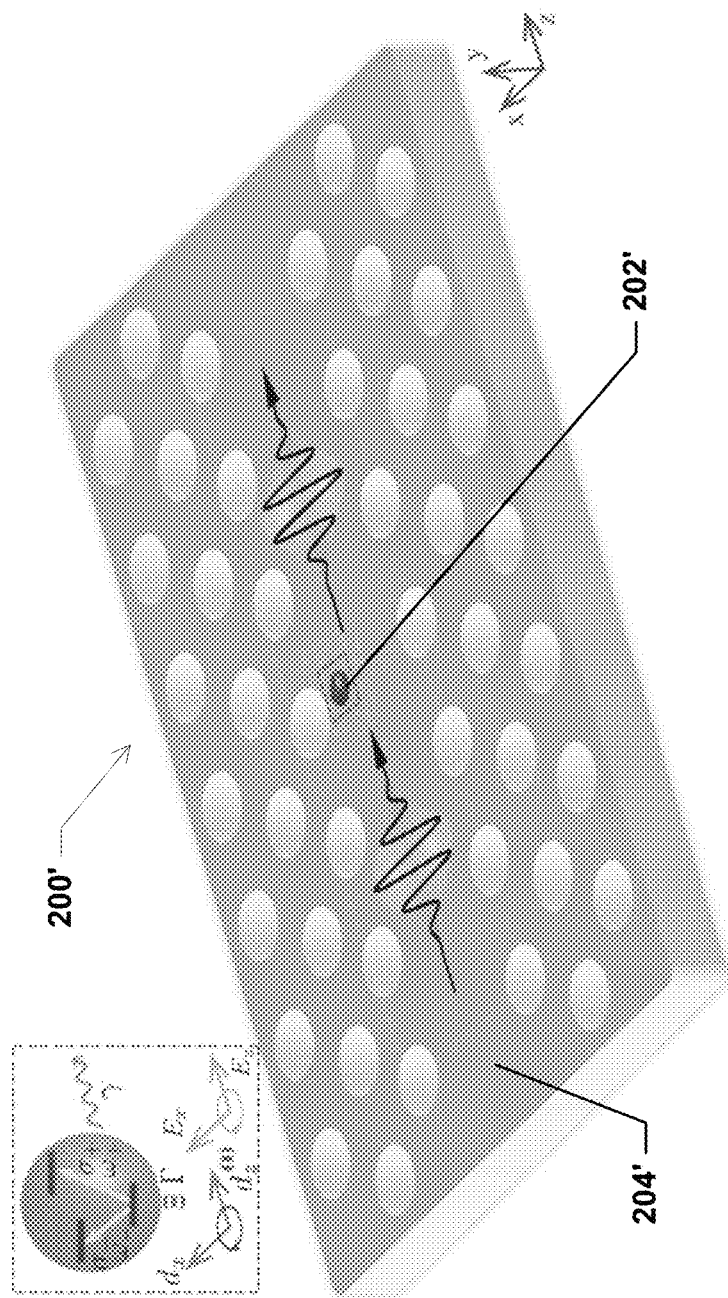
FIG. 1 contains a schematic diagram of one possible implementation of a C-Z gate in accordance with one aspect of the disclosure.
Figure 2:
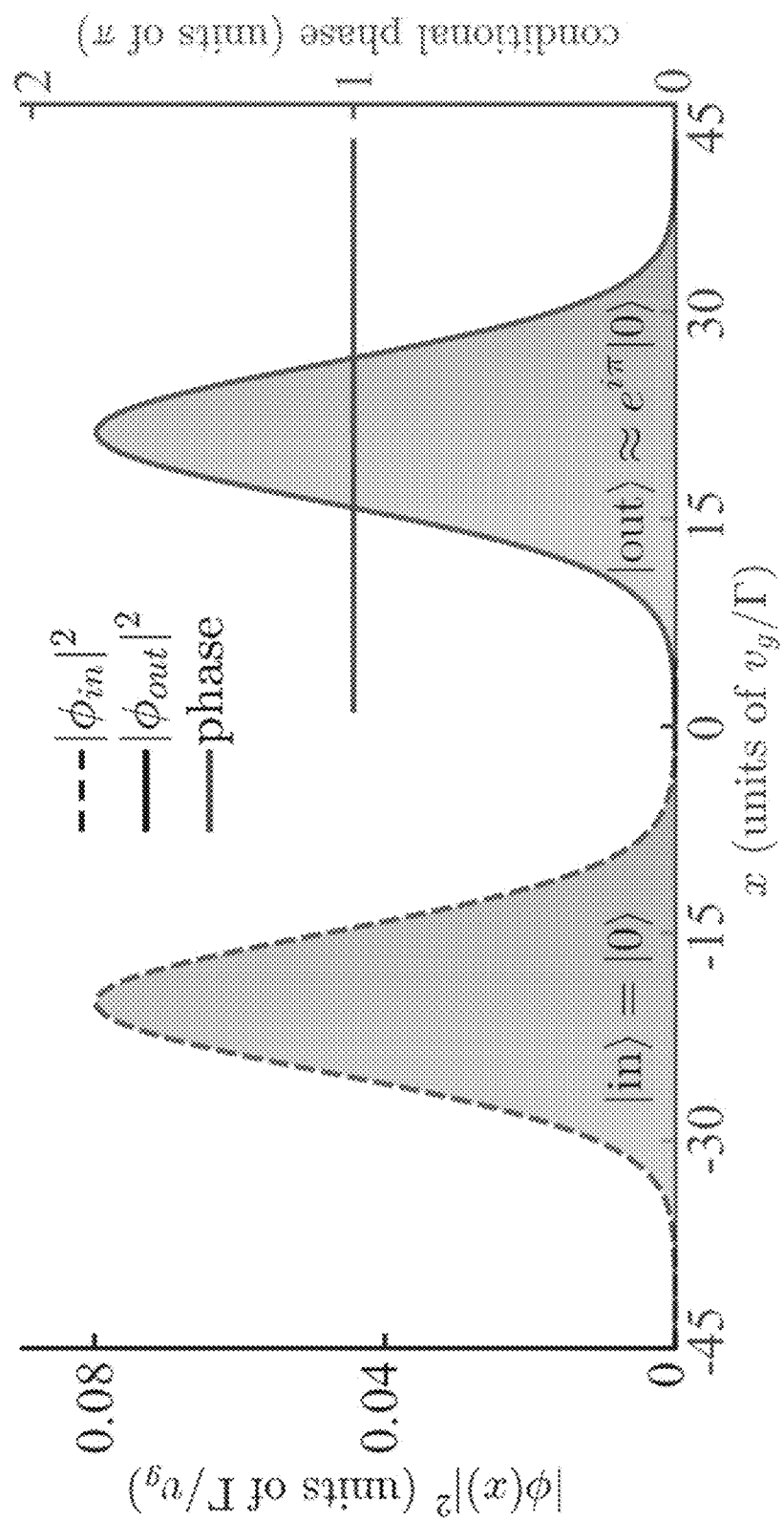
FIG. 2 is a graph summarizing the wave functions of the in-state and out-state wave function amplitudes of a long Gaussian pulse ($\sigma=5v_g/\Gamma$) with in-state $|0\rangle$ injected from the left of a dipole emitter positioned at x=0, as well the phase of the outgoing Gaussian pulse.
Figure 3A:
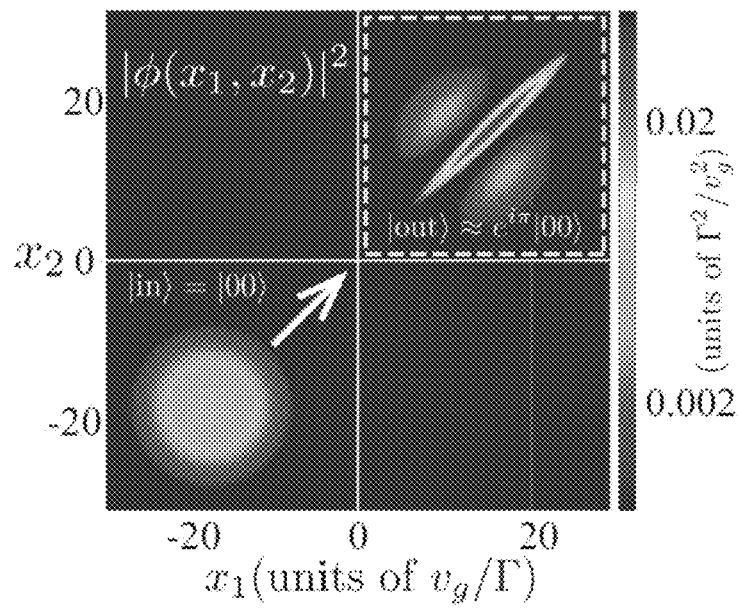
FIG. 3A is a map summarizing the wave function density for an input state $|00\rangle$ (third quadrant) and associated output state (first quadrant). The output state is a combination of a diagonal region corresponding to a photonic molecule and a pair of lateral lobes corresponding to a two-photon wave function.
Figure 3B:
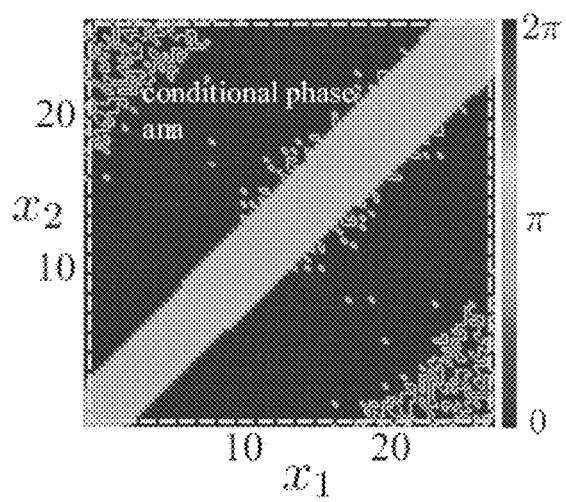
FIG. 3B is a map of the analytical results of the conditional phase of the output state of FIG. 3A; the speckles correspond to noise associated with the jump from $2\pi+$ to $0-$, both of which indicate zero phases and therefore do not affect the results.
Figure 3C:
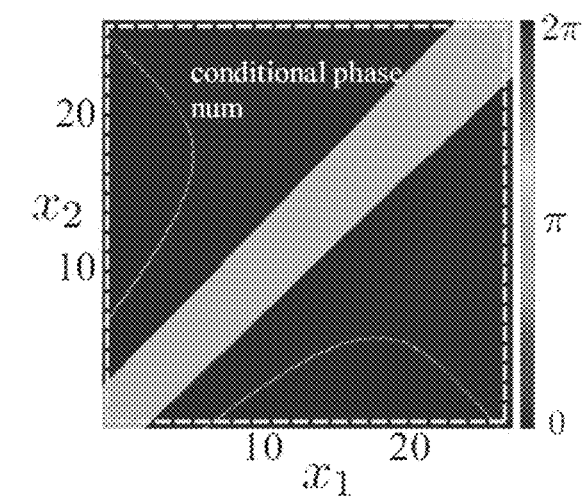
FIG. 3C is a map of numerical results of the conditional phase as determined by a simulation of the conditions used in FIGS. 3A and 3B.
Figure 4:
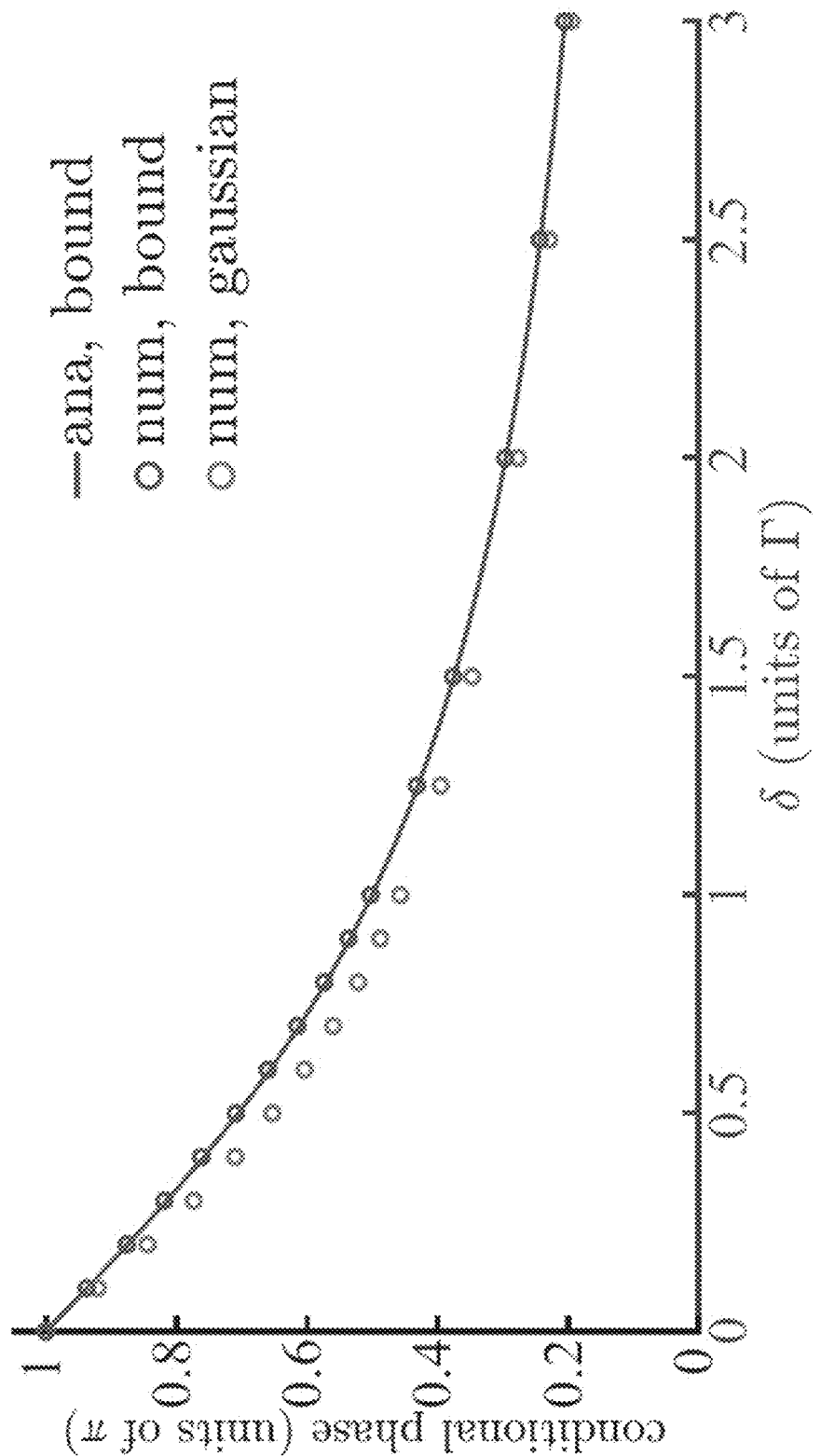
FIG. 4 contains a graph comparing analytical and numerical results of the conditional phase as a function of $\delta$ when $\gamma=0$.

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION OF THE DISCLOSURE

In various aspects, a photon-based controlled phase gate (also referred to herein as a controlled Z gate or a C-Z gate) with high fidelity and high efficiency is disclosed that includes a solid-state quantum electrodynamics (QED) system with at least one chiral waveguide.

This constrained unidirectional propagation of qubits through the chiral waveguide facilitates quantum nonlinear optical processes used to implement the operation of the photon-based controlled phase gates in various aspects. In some aspects, the disclosed phase gates introduce a nonlinear π phase shift for two photons via the formation of a photonic bound state (photonic molecule) through a quantum nonlinear optical χ(3) process facilitated by the chiral waveguide system as described in additional detail herein.

In various other aspects, a high-fidelity frequency-encoded deterministic two-photon controlled-phase gate is disclosed that includes an arrangement of a pair of the photon-based controlled phase gates disclosed herein. In various aspects, the two-photon controlled-phase gate makes use of the non-reciprocal photonic propagation of the photon-based controlled phase gates in various aspects. In various other aspects, the two-photon controlled-phase gate exploits strong photon-photon correlations enabled by photonic dimers, and the unique non-reciprocal photonic propagation in chiral quantum nanophotonic systems, as described in additional detail below. In some aspects, chiral quantum nanophotonic elements of the disclosed gate provide for non-reciprocal photon transport and the formation of two-photon dimers with a unique nonlinear phase. In some aspects, the chiral quantum nanophotonic elements are engineered to provide for strong photon-photon correlation and single-photon-level optical nonlinearity. In some aspects, the chiral optical waveguides of the two-photon controlled-phase gate provide for the efficient formation of the two-photon dimers that acquire a non-trivial π phase shift after transmitting through the quantum emitter.

A variety of advantages associated with the deterministic photonic two-qubit gates as disclosed herein overcome at least some of the shortcomings of previous devices and provide for a variety of different applications. The disclosed deterministic photonic two-qubit gate does not require substantial resource overhead, such as large cluster states or auxiliary single photons, and provides a much higher intrinsic success rate as a result of the strong photon-photon correlation and single-photon-level optical nonlinearity associated with the disclosed gates. In various aspects of the gate, the strong photon-photon interactions are implemented in solid-state platforms, a much simpler and tunable platform as compared to previous devices that made use of electromagnetically induced transparency (EIT) within ultra-cold atomic systems in the Rydberg blockade regime. Compared with the existing ultra-cold atom systems, the nanoscale semiconductor waveguides used in the disclosed gates offer a tighter photonic confinement such that the interference effect can fundamentally alter the photonic transport. Chiral photon-quantum emitter interaction can also be implemented in fully reciprocal optical waveguides to further mold the photonic flow, yielding a chiral quantum nanophotonic system with a non-reciprocal light propagation. Semiconductor platforms can be more easily integrated on a chip to enable a fully-scalable quantum architecture.

The development of a high-fidelity deterministic two-qubit photonic controlled-phase (controlled-Z) gate is described herein, including the development of the theoretical framework and the computational schemes, as well as the experimental demonstration of the gate functionalities in a solid-state platform.

Photonic Dimers

In various aspects, the photon-controlled phase gates and two-photon controlled-phase gates form photonic dimers and leverage the unique interaction of the photonic dimers with the quantum emitters within chiral waveguides to implement the function of the disclosed gates. The term "photonic dimers" or "photonic molecule", as used herein, refers to a pair of photons in a photonic bound state as described The existence of bound states of light quanta have been proposed in specifically engineered media with strong optical nonlinearities; the recent demonstration of the photonic bound states (PBs) in ultra-cold atoms has opened a new research direction for nonlinear quantum optical physics. The simplest realization is a two-photon dimer consisting of two entangled photons, which has a Lorentzian energy anti-correlation and temporal proximity between the constituent photons (see FIGS. 13A and 13B). The photons of the dimer propagate as a single composite photon with properties that differ from the corresponding individual photons. The dimer is characterized by two time scales: the coherence time T (the temporal duration of each photon) and the correlation time τ (the temporal width of the relative wavefunction of the entangled photons). Additional description of photonic dimers and other photonic molecules is contained in U.S. Pat. No. 10,833,469, the content of which is incorporated by reference in its entirety.

Figure 13A:
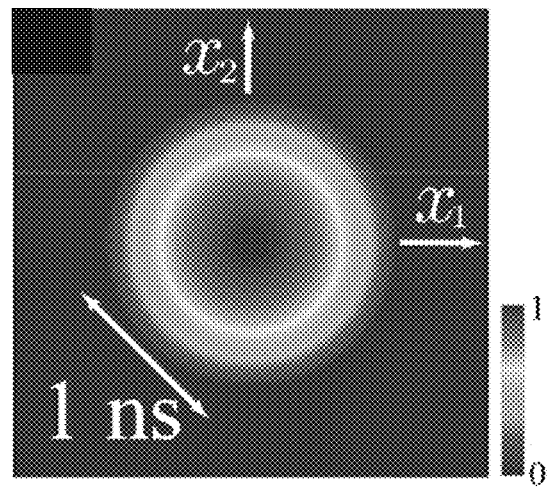
FIG. 13A contains a probability density map of a Gaussian pulse with T=1 ns; x1 and x2 are the locations of the photons.
Figure 13B:
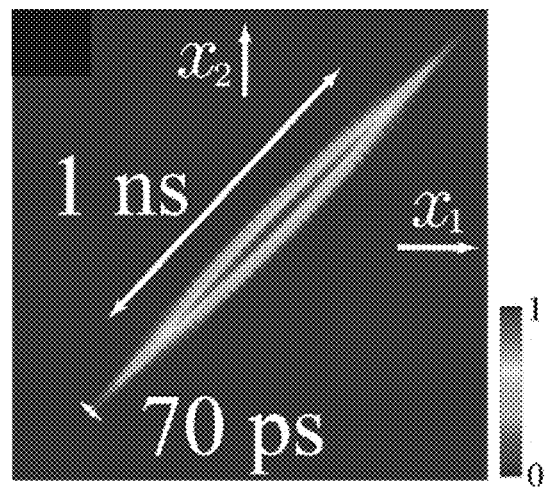
FIG. 13B contains a probability density map of a photonic dimer with T=1 ns and $\tau=70$ ps; x1 and x2 are the locations of the photons.
Figure 13C:
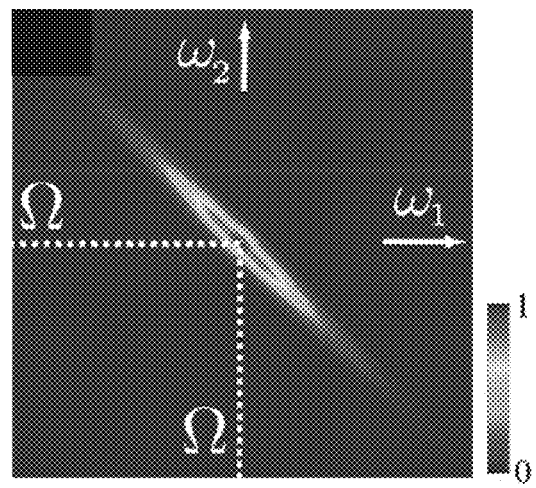
FIG. 13C contains a joint frequency spectrum of the photonic dimer of FIG. 13B, showing frequency anti-correlation.

The photonic bound states are characterized by at least several salient features. The joint two-photon coincidence probability decays exponentially as $\sim e^{-\Delta t/\tau}$ as the difference of the photon arrival times Δt increases. As a consequence, the second-order correlation function g(2) exhibits a cusp, which manifests the photonic bunching behavior and is characteristic of the two-photon bound state. In addition, photonic dimers could be formed by interacting with a single quantum emitter (atom or quantum dot) positioned in engineered media. In optical waveguides, the correlation time $\tau \propto 1/v_g$ is tunable via dispersion engineering the photonic group velocity vg. The temporal and frequency entanglement between the correlated photons endow multi-photon excitation processes with an enhanced efficiency which is well-suited for many applications, including optical memory, molecular Stark effect, and coherent quantum control of multi-photon transitions. A probability density plot of a two-photon Fock state corresponding to a photonic dimer is shown in FIG. 13B and the probability density plot of a two-photon Gaussian pulse is shown in FIG. 13A for comparison. The joint frequency spectrum of the photonic dimer is shown in FIG. 13C.

Controlled-Phase Gate

In various aspects, the controlled-phase gates described herein include an arrangement of elements to implement the non-trivial transmission phase acquired by incident quantum photonic states in a chiral waveguide. In various aspects, the chiral waveguide includes either an effective chiral waveguide or a genuine chiral waveguide as described in additional detail herein. As used herein, the term "effective chiral waveguide" refers to a reciprocal waveguide that chirally couples to a two-level quantum emitter. As used herein, the term "genuine chiral waveguide" refers to a non-reciprocal waveguide that exclusively supports unidirectional propagation modes due to the topological protection against backscattering from disorder. The chiral waveguides are similarly coupled to two-level quantum emitters.

In various aspects, both the effective and genuine chiral waveguides act as chiral two-level photonic gates that implement unidirectional transmission of qubit inputs by the quantum emitters. As described herein, the chiral two-level photonic gates map the quantum state of the input qubits to an output state of the output qubits using qubit-emitter interactions that differ depending on the state of the input qubit, as described in additional detail herein.

In some aspects, chiral photon-quantum emitter interactions are implemented in reciprocal optical waveguides to realize a chiral quantum nanophotonic system that only permits unidirectional light propagation. The waveguides are single-polarization single-moded (SPSM) waveguides so that there is no mode-conversion and the inter-photon correlations interactions are maximized. It is to be noted that the fundamental mechanisms of the chiral waveguides are different from those in the photonic topological waveguides with chiral edge channels that provide topological protection against backscattering from disorder.

In one aspect, the controlled phase gate will be based on a photonic crystal (PhC) waveguide featuring a glide plane structure incorporating a dipole emitter including, but not limited to, an InGaAs quantum dot or a defect state in single-walled carbon nanotubes. In various aspects, a variety of other nanophotonic waveguide structures can also be used to facilitate the chiral photon-emitter interaction. In one aspect, a reciprocal waveguide is used and the dipole emitter is positioned at a chiral point where the forward- or right-propagating mode matches with the emission polarization of the dipole emitter. In some aspects, polarization or wavelength selectivity of the chiral atoms can be implemented using either a negatively charged dot or a positively charged dot with an applied magnetic field. In various aspects, a variety of other nanophotonic waveguide structures such as suspended nanowire waveguides can also be used to facilitate the chiral photon-emitter interaction. In some aspects, a dipole emitter is placed at a chiral point within the waveguide where the forward-propagating mode matches with the emission polarization of the dipole emitter.

In one aspect, the controlled-phase gates disclosed are configured to introduce a π phase shift for resonant chiral photons, corresponding to input qubits with $|0\rangle$ phase. The mechanisms include creating and implementing genuine chiral waveguides, in which the waveguides are configured to support or effective chiral waveguides via the chiral photon-quantum dot couplings as described herein. Conventional wisdom suggests that two uncorrelated $|0\rangle$ photons interacting with the same dipole emitter will result in a π+π=2π (phase shift. In various aspects, the formation of a two-photon bound state (a photonic dimer) as a result of the nonlinear interaction with the dipole emitter results in a non-trivial π phase shift. This non-trivial phase shift provides for a means of qubit mapping that makes possible the deterministic two-photon controlled-phase gate described herein.

In various aspects, the controlled-phase gate may include any suitable two-level dipole emitter without limitation. Non-limiting examples of suitable two-level dipole emitters include Rydberg atoms, quantum dots, superconducting qubits, and N—V centers.

Figure 9:
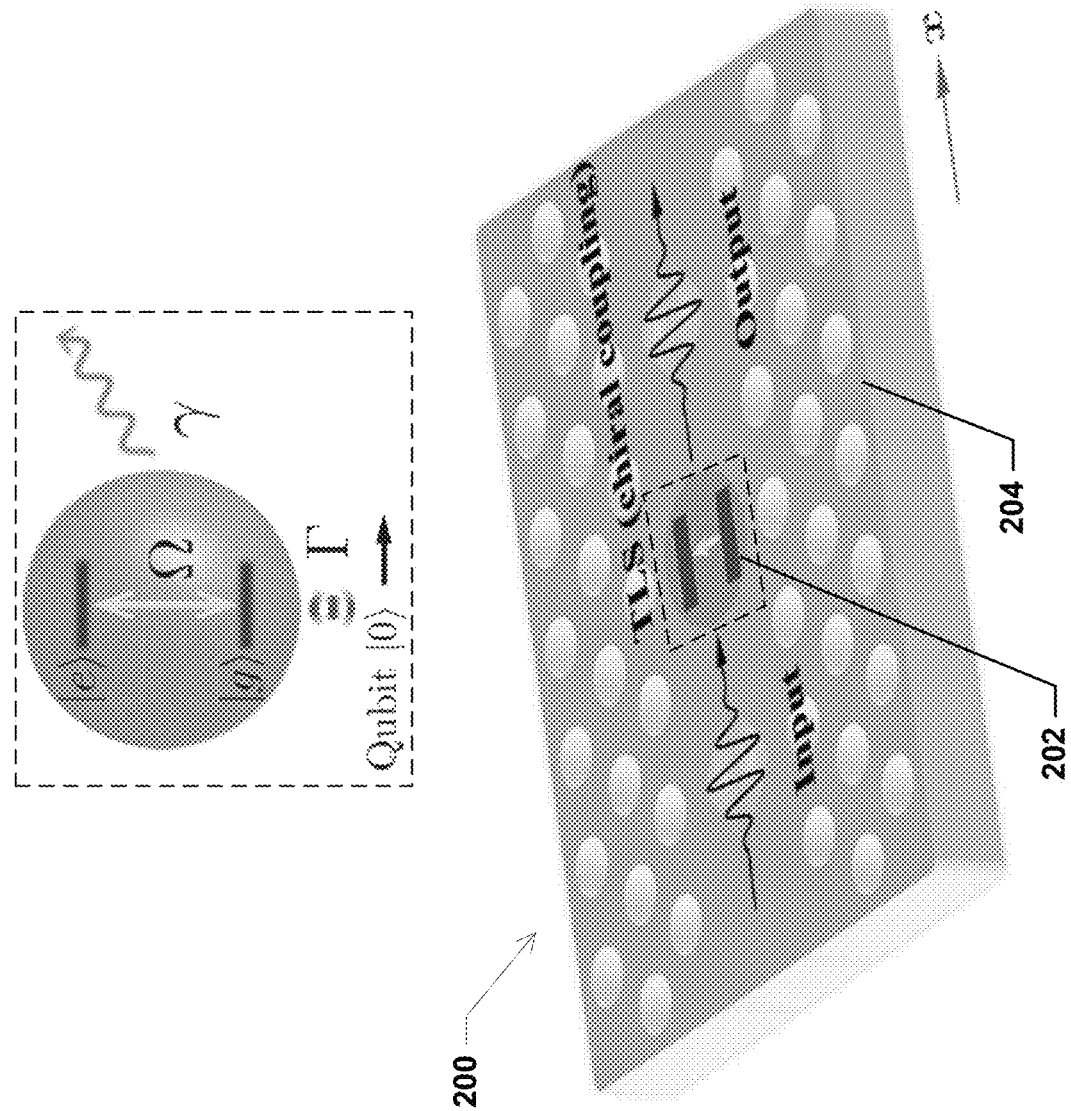
FIG. 9 contains a schematic diagram of a chiral two-level system (TLS) in accordance with one aspect of the disclosure.

FIG. 9 is a schematic diagram of a chiral waveguide 200 in one aspect. The chiral waveguide 200 includes a dipole emitter 202 positioned within a waveguide 204. In various aspects, the chiral waveguide 200 is configured to facilitate a chiral photon-emitter interaction. As described herein, the chiral photon-emitter interaction can be induced by any known means without limitation. In one aspect, the dipole emitter 202 is a quantum dot and chiral photon-emitter interactions are induced using Zeeman splitting by a magnetic field. In another aspect, selective placement of the quantum dot at a chiral point in the reciprocal waveguide is used to induce chiral photon-emitter interactions.

Referring again to FIG. 9, two orthogonal qubits $|0\rangle$ and $|1\rangle$ are different propagating modes supported in the waveguide. The two-level atom 202 of transition frequency $\Omega$ is coupled to only the state $|0\rangle$, while qubit $|1\rangle$ is decoupled from the atom. $\Gamma$ and $\gamma$ are atomic decay rates into the waveguided and non-waveguided modes, respectively.

The Hamiltonian to describe the motion of $|0\rangle$ is given by:

$$\frac{H_{|0\rangle}}{\hbar} = \int dx c^\dagger(x)(-iv_g \partial_x)c(x) + \qquad \text{Eqn. (8)}$$
$$\int dx V \delta(x)[c^\dagger(x)\sigma_- + \sigma_+ c(x)] + \omega_g a_g^\dagger a_g + (\omega_e - i\gamma)\omega_g a_e^\dagger a_e$$

The Hamiltonian to describe the motion of $|1\rangle$ is given by:

$$\frac{H_{|1\rangle}}{\hbar} = \int dx c^\dagger(x)(-iv_g \partial_x)c(x) \qquad \text{Eqn. (9)}$$

FIG. 1 contains a schematic diagram of a chiral waveguide 200' in another aspect. The chiral waveguide 200' includes a dipole emitter 202' that supports two orthogonally circularly polarized transitions. The dipole emitter 202' is embedded in a two-mode (no chirality is required) photonic crystal waveguide 204'. $\sigma_\pm$ and $\omega_\pm$ denote the helicity and corresponding transition frequencies of the dipole transitions due to Zeeman split ($|\omega_+ - \omega_-| \gg \Gamma$). $\Gamma$ and $\gamma$ are atomic decay rates into waveguided and non-waveguided modes, respectively. $d_x$ and $d_z$ are the dipole moment amplitudes (omits the common phase factor of dipole oscillation $e^{i\omega_\pm t}$ information, but encodes the relative phase difference between z and x directions) for the $\sigma_\pm$ transition of the emitter. $E_x$ and $E_z$ are the electrical field amplitude (omits the common phase factor of wave propagation $e^{i(\pm k_z z - \omega t)}$ information, but encodes the relative phase difference between z and x directions) at which the dipole emitter is embedded, denoted by the point P. Photon pulses are injected from the (−) z-direction.

In some aspects, the photons are operating at $\omega_+$. The notations are clarified in the caption. We now investigate the necessary conditions for realizing such a system (which is non-trivial). Since the y component is uniform and the dipole emitter only has components along x and z, so that the y degree of freedom will be entirely suppressed. Here, to facilitate the understanding of our system, we clarify the notation of the electrical field (E-field) $\vec{E}_{R,+}$ for a $\sigma_+$ polarized photon propagating to the right. Here right denotes the direction from −z to +z and left is the opposite direction. + denotes the right-hand circularly polarized electrical field from +y perspective. If $E_z$ is accompanied by the phase factor $e^{-i\omega t}$, $E_x$ should lag a $\pi/2$ phase (corresponds to the phase $e^{-i(\omega t - \pi/2)}$) so that $E_x = iE_z$. That is:

$$\vec{E}_{R,+} = E_z \vec{e}_z + E_x \vec{e}_x = E_{01} \vec{e}_z + iE_{01} \vec{e}_x \qquad \text{Eqn. (17)}$$

where $E_{01}$ is the magnitude of amplitude for both directions. $\vec{e}_x$ and $\vec{e}_z$ denote unit vectors along x- and z-directions, respectively. Similarly, the other three E-fields are expressed as:

$$\vec{E}_{L,-} = E_{02} \vec{e}_z - iE_{02} \vec{e}_x \qquad \text{Eqn. (18)}$$

$$\vec{E}_{R,-} = E_{03} \vec{e}_z - iE_{03} \vec{e}_x \qquad \text{Eqn. (19)}$$

$$\vec{E}_{L,+} = E_{04} \vec{e}_z + iE_{04} \vec{e}_x \qquad \text{Eqn. (20)}$$

Here, we do not impose the time-reversal condition ($\vec{E}_{R,+} = \vec{E}^*_{L,-}$, $\vec{E}_{R,-} = \vec{E}^*_{L,+}$, * denotes the complex conjugate) because it is be required to be broken. The broken conditions are clarified later. Following similar arguments, the dipole moment can also be written in the following $$\vec{d}_+ = d_z \vec{e}_z + d_x \vec{e}_x = d_0 \vec{e}_z - id_0 \vec{e}_x \qquad \text{Eqn. (21)}$$

$$\vec{d}_- = d_0 \vec{e}_z + id_0 \vec{e}_x \qquad \text{Eqn. (22)}$$

where $d_0$ is the magnitude of dipole moment along x- and z-directions. Here we examine the coupling for $\sigma_+$-polarized photons with admissible dipole transitions in the following:

$$V_{R,+} \propto \vec{E}_{R,+} \cdot \vec{d}_+ = 2E_{01} d_0 \neq 0 \qquad \text{Eqn. (23)}$$

$$V_{L,-} \propto \vec{E}_{L,-} \cdot \vec{d}_- = 2E_{02} d_0 \neq 0 \qquad \text{Eqn. (24)}$$

$$V_{R,-} \propto \vec{E}_{R,-} \cdot \vec{d}_- = 2E_{03} d_0 \neq 0 \qquad \text{Eqn. (25)}$$

$$V_{L,+} \propto \vec{E}_{L,+} \cdot \vec{d}_+ = 2E_{04} d_0 \neq 0 \qquad \text{Eqn. (26)}$$

Here, $V_{R,+}$ denotes the coupling strength for the $\sigma_+$-allowed transitions for the right-moving $\sigma_+$-polarized photon and other notations are similarly defined. Based on the argument, one can write down the following Hamiltonian for the $\sigma_+$-polarized photon $$\frac{H_+}{\hbar} = \int dx c_R^\dagger(x)(-iv_g \partial_x) c_R(x) + \qquad \text{Eqn. (27)}$$

$$\int dx c_L^\dagger(x)(-iv_g \partial_x) c_L(x) + \int dx V_{R,+} \delta(x) [c_R^\dagger(x) \sigma_-^{(+)} + \sigma_+^{(+)} c_R(x)] +$$

$$\int dx V_{L,+} \delta(x) [c_L^\dagger(x) \sigma_-^{(+)} + \sigma_+^{(+)} c_L(x)] + \omega_g a_g^\dagger a_g + (\omega_e - i\gamma) a_e^\dagger a_e$$

where $\sigma_+^{(+)}$ denotes the ladder operator for the $\sigma_+$-allowed dipole transitions and other notations are similarly defined. Likewise, for the $\sigma_-$-polarized photon, it follows that:

$$\frac{H_-}{\hbar} = \int dx c_R^\dagger(x)(-iv_g \partial_x) c_R(x) + \qquad \text{Eqn. (28)}$$

$$\int dx c_L^\dagger(x)(-iv_g \partial_x) c_L(x) + \int dx V_{R,-} \delta(x) [c_R^\dagger(x) \sigma_-^{(-)} + \sigma_+^{(-)} c_R(x)] +$$

$$\int dx V_{L,-} \delta(x) [c_L^\dagger(x) \sigma_-^{(-)} + \sigma_+^{(-)} c_L(x)] + \omega_g a_g^\dagger a_g + (\omega_e - i\gamma) a_e^\dagger a_e$$

where $\sigma_-^{(-)}$ denotes the ladder operator for the $\sigma_-$-allowed dipole transitions, and other notations are similarly defined.

Here, we impose the conditions to realize the chiral Hamiltonian. For the $\sigma_+$-polarized photon, the right-moving photons should not be backscattered so that $V_{R,+} \gg V_{L,+}$ is required. Under such a condition, Eqn. (28) now reduces to:

$$\frac{H_+}{\hbar} = \int dx c_R^\dagger(x)(-iv_g \partial_x) c_R(x) + \int dx c_L^\dagger(x)(-iv_g \partial_x) c_L(x) + \qquad \text{Eqn. (29)}$$

$$\int dx V_{R,+} \delta(x) [c_R^\dagger(x) \sigma_-^{(+)} + \sigma_+^{(+)} c_R(x)] + \omega_g a_g^\dagger a_g + (\omega_e - i\gamma) a_e^\dagger a_e$$

For the $\sigma_-$-polarized photon, since the photon is operating at the frequency of $\sigma_-$, the large detuning essentially disables the dipole transition so that there is no requirement on the coupling. That is, the $\sigma_-$-polarized photon undergoes the trivial free propagation process. To sum it up, to realize the chiral-coupling in the two-mode waveguide, the E-field intensity at the dipole emitter position P should be carefully designed such that both $\sigma_+$ polarized photons and $\sigma_-$ polarized photons are supported to propagate to the right at P (i.e., $E_{01}$, $E_{03} \neq 0$). Further $E_{01} \gg E_{04}$ so that the $\sigma_+$ polarized photon is subject to a chiral Hamiltonian. In addition, time-reversal symmetry should be broken. If it is not broken, $E_{01} = E_{04}$ so that $E_{01} \gg E_{03}$ (based on (ii)). Considering that both $\sigma_+$ polarized and $\sigma_-$ polarized right-moving photons are of similar E-field amplitude ($E_{01} \approx E_{04}$), $E_{01} \gg E_{03}$ may not be fulfilled if the time-reversal symmetry is not broken.

In additional aspects, the circularly-polarized dipole emitter coupled to the circularly-polarized electrical field in the photonic crystal waveguide described above may use photon frequency to encode the qubits rather than the direction of circular polarization. In these additional aspects, the orthonormal states labeled by frequency are given by:

$$|\omega\rangle = \frac{1}{\sqrt{2\pi v_g}} \int dx e^{i\frac{\omega}{v_g}x} c^\dagger(x) \qquad \text{Eqn. (30)}$$

$$\langle \omega' | \omega \rangle = \delta(\omega - \omega') \qquad \text{Eqn. (31)}$$

Using the frequency-encoded orthonormal states as defined above, waveguide support of $\sigma_-$ polarized photons propagating to the right at P are no longer required. Both qubits are based on $\sigma_+$ polarized photons of different frequencies:

$$|0\rangle = |\omega_+\rangle \qquad \text{Eqn. (32)}$$

$$|1\rangle = |\omega_-\rangle \qquad \text{Eqn. (33)}$$

In other additional aspects, the gate may be a single emitter coupled to a genuine chiral waveguide. Consider when a single emitter is coupled to a genuine chiral waveguide. The chiral waveguide supports unidirectional propagation modes due to the topological protection against backscattering from disorder. If the chiral waveguide provides two orthogonal E-field modes (i.e., qubits |0⟩ and |1⟩) at the dipole emitter position (P). For example, left/right-handed circularly-polarized E-field at P coupled to the same dipole emitter as shown in FIG. 1; the horizontal/vertical linearly-polarized E-field at P coupled to a horizontally linearly-polarized dipole emitter; and exploiting the photon frequency degree of freedom.

By way of non-limiting example, the dipole emitter is driven in the Faraday configuration and the |0⟩ photon is in resonance with the $\sigma^+$ transition. In the implementation of the controlled phase gate, the |1⟩ photon will be detuned from and therefore does not interact with the dipole emitter. Without being limited to any particular theory, a 1D waveguide with chiral light-matter interaction can maximize the efficiency of generating and extracting the two-photon bound states, resulting in the nontrivial phase shift used by the two-photon frequency-controlled photonic gates as disclosed herein. In addition, the efficient coupling between the chiral PhC waveguide and the dipole emitter maximizes the probability that a |01⟩ and |10⟩ qubit, described in additional detail herein, also picks up a $\pi$ phase shift.

In various aspects, the photon-quantum dot scattering process in an effective chiral photonic waveguide may be described by a Hamiltonian:

$$\frac{H_{|0\rangle}}{\hbar} = \int dx c^\dagger(x)(-iv_g \partial_x)c(x) + \int dx V\delta(x)\left[c^\dagger(x)\sigma_- + \sigma_+ c(x)\right] + 1/2\hbar\Omega\sigma_z \quad \text{Eqn. (1)}$$

where $c^\dagger(x)$ and $c(x)$ are the creation and annihilation operators for the unidirectional (right-moving in this case) photon at position x; $v_g$ is the group velocity of photons in the waveguide. $\sigma_+$ is the ladder operator describing the excitation of the quantum dot, and the last term describes the quantum dot. $\Omega$ is the transition frequency; V is the photon-dot interaction strength and $\gamma$ describes the dissipation and dephasing.

In various other aspects, the photon-chiral atom scattering process in a photonic waveguide may be described by another Hamiltonian:

$$\frac{H}{\hbar} = \int dx c^\dagger(x)(-iv_g \partial_x)c(x) + \int dx \delta(x)\left[Vc(x)a_e^\dagger a_g + h.c.\right] + \omega_g a_g^\dagger a_g + (\omega_e - i\gamma)a_e^\dagger a_e \quad \text{Eqn. (2)}$$

In Eqn. (2), the first term describes the waveguided photons propagating with a group velocity $v_g$. $c^\dagger(x)$ (c(x)) is the creation (annihilation) operator for the unidirectional (right-moving in this case) photon at position x. The next term describes the absorption of a photon and the excitation of the chiral atom from the ground state to the excited state with a coupling strength V. $a_{g,e}^\dagger$ ($a_{g,e}$) is the creation (annihilation) operator of the corresponding atomic ground and excited state, respectively. The h.c. term refers to the hermitian conjugate and describes the time-reversed relaxation process with an emitted photon. The last two terms describe the energy of the atomic states. $\Omega=\omega_e-\omega_g$ is the transition frequency of the atom and $\gamma$ is the dissipation of the excited state. The decay rate of the excited states into the waveguided mode is $\Gamma=V^2/v_g$ and the spontaneous emission lifetime of the atom is $\tau_0=1/\Gamma$.

Transmission Phases of Controlled-Phase Photonic Gates

In various aspects, a photonic input state is 'mapped' by the chiral atom of the controlled phase gates disclosed herein into an output state. The transmission amplitude of the photonic input through the chiral atom depends on the nature of the photonic state. In particular, for a multi-photon input, the correlated transport due to the photon-chiral atom interactions can induce a non-trivial nonlinear phase shift in the transmission amplitude.

Transmission of a Single Photon

The transmission amplitude for a single-photon input of frequency $\omega$ is:

$$t_\omega = \frac{\omega - (\Omega - i\gamma) - i\Gamma/2}{\omega - (\Omega - i\gamma) + i\Gamma/2} \quad \text{Eqn. (3)}$$

For a far-detuned photon ($|\omega-\Omega| \gg \gamma, \Gamma$), the transmission phase is trivially 0 ($t_\omega \approx +1 = e^{i0}$). For a resonant photon ($\omega \approx \Omega$), however, $t_\omega \approx -1 = e^{i\pi}$ when $\gamma \gg \Gamma$ and consequently the transmitted photon acquires a $\pi$ phase shift.

Transmission of Two Photons

For an uncorrelated two-photon Fock state (product state) input with identical photons each at frequency $\omega$, the output states consist of the two-photon plane-wave state $|W_{k,p}\rangle$ (describing independent photon transport) with a transmission amplitude $t_\omega \times t_\omega$, and the two-photon bound state $|B_E\rangle$ (describing correlated photon transport) with a transmission amplitude $$t_{2 photons} = \frac{2\omega - 2(\Omega - i\gamma) - i2\Gamma}{2\omega - 2(\Omega - i\gamma) + i2\Gamma} \quad \text{Eqn. (4)}$$

For resonant photons, the plane-wave state has a transmission amplitude $(-1)^2=1$ (trivial phase 0), while the two-photon bound state has a transmission amplitude $\approx -1$ (nontrivial phase $\pi$) when $\gamma \gg \Gamma$, which provides the necessary enabling quantum state transformation for a controlled-phase gate. The $\pi$ phase shift is contaminated by the two-photon plane-wave state, and the degree of the contamination is determined by the relative weight (the fidelity) of the states in the output. The formation of a photonic bound state via two independent photons in a Fock state manifests the most fundamental quantum nonlinear optical $\chi^{(3)}$ process.

In a chiral waveguide, there are two two-photon eigenstates of the scattering matrix S: (i) a two-photon plane-wave state $|W_{\omega_1,\omega_2}\rangle$ which describes independent (uncorrelated) photon transport and has a transmission amplitude that is a product of the two single-photon transmission amplitudes: $t_W=t_{\omega_1} \times t_{\omega_2}$; and (ii) a two-photon dimer state $|B_{2\omega}\rangle$ which describes correlated photon transport and has a transmission amplitude given by Eqn. (4).

The formation of a photonic dimer via a Fock state containing two independent photons manifests the most fundamental quantum nonlinear optical $\chi(3)$ process. The existence of the photonic dimers has been experimentally confirmed. For an input of resonant two-photon plane-wave state $|W_{\omega_1,\omega_2}\rangle$ ($\omega_1 \approx \omega_2 \approx \Omega$), the transmission amplitude $t_W \approx (-1)^2=1$ (trivial two-photon phase 0), while an input of resonant two-photon dimer $|B_{2\omega}\rangle$ ($\omega \approx \Omega$) has a transmission amplitude $\approx -1$ (nonlinear two-photon phase $\pi$) when $\gamma \ll \Gamma$.

The two-photon dimer $|B_{2\omega}\rangle$ furnishes the set of quantum states with the desired transformation property for the controlled-phase gate.

Transmission of Non-Interacting Photons

Non-interacting photons: For non-interacting photons (which we shall denote as the $|1\rangle$ qubit), due either to frequency detuning or mismatch of polarization or other characteristics, each transmitted photon has a transmission amplitude 1 and thus acquires a trivial phase 0.

In the effective chiral waveguide, the transmissions for the single resonant $|0\rangle$ and the non-interacting $|1\rangle$ qubit states, as well as the two-qubit states $|00\rangle$ and $|11\rangle$, can all be as large as nearly 1.

Non-resonant photons: For non-resonant photons, due either to frequency detuning or mismatch of polarization or other characteristics, each transmitted photon has a transmission amplitude 1 and thus acquires a trivial phase 0.

Figure 10A:
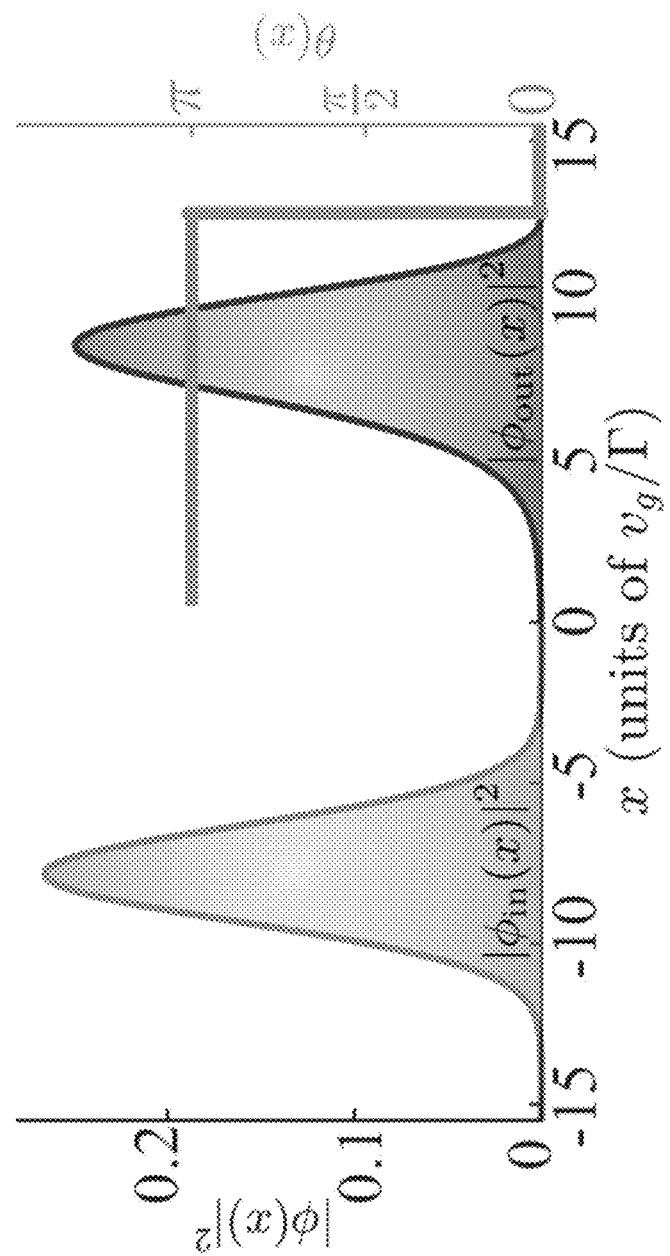
FIG. 10A contains a probability density plot for resonant photons in the single-photon case. The green curve indicates the numerical $\pi$ phase shift.

By way of non-limiting example, a computational simulation of the controlled-phase gate was conducted. The equations of motion, governed by the Hamiltonian in Eqn. (1), were evolved numerically in time to trace out the full spatiotemporal dynamics of the scattering process. The numerical approach employed standard numerical discretization and was independent of any ansatz adopted in the analytical approach described above. The numerical results of this computational simulation provided an independent check of the analytical predictions described above. We first consider the case when a single resonant photon is injected from the left in the chiral waveguide in FIG. 9. The incident photon is described by a finite-bandwidth Gaussian pulse $$\phi_{in}(x) = \frac{1}{(2\pi\sigma)^{1/4}} e^{-\frac{(x-x_0)^2}{4\sigma^2}+ik_0 x} \quad \text{Eqn. (6)}$$

where $\sigma$ is the spatial width, $x_0$ is the initial position, and $k_0 v_g (=\Omega)$ is the center frequency of the Gaussian pulse. After scattering, the phase shift $\theta(x)$ acquired by the transmitted photon $\phi_{out}(x)$ is obtained by $\theta(x) = \arg[\phi_{out}(x)/\phi_{ref}(x)]$, where $\phi_{ref}(x)$ is a reference wavefunction describing a resonant photon undergoing free propagation ($\Gamma=0$). FIG. 10A plots the probability density (amplitude square) of the incoming and outgoing photons, respectively. The single-photon phase shift (green curve) is numerically found to be $\pi$, as predicted by Eqn. (3). Next, consider a resonant two-photon Gaussian Fock state input:

$$\phi_{in}(x_1, x_2) = \frac{1}{(2\pi\sigma)^{1/2}} e^{-\frac{(x_1-x_0)^2}{4\sigma^2}-\frac{(x_2-x_0)^2}{4\sigma^2}+ik_0(x_1+x_2)} \quad \text{Eqn. (7)}$$

Figure 10B:
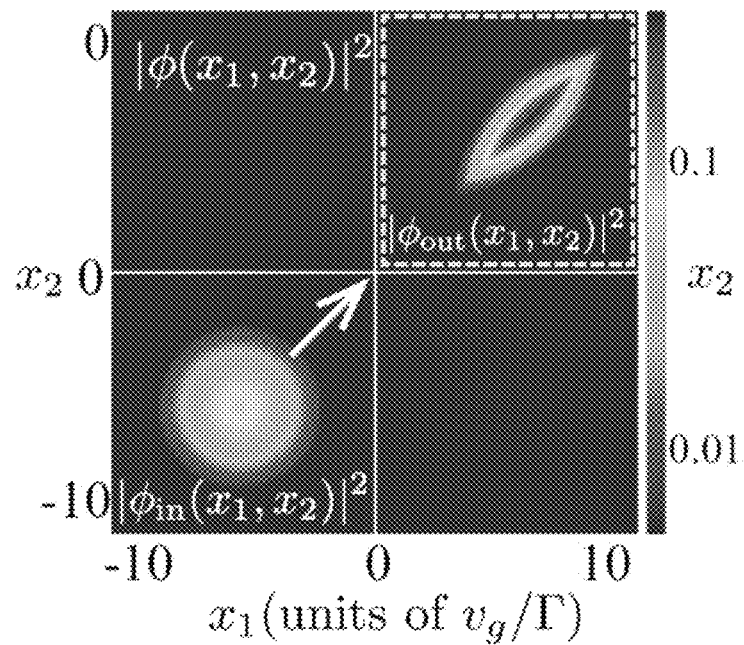
FIG. 10B contains a probability density map for the two-photon case.
Figure 10C:
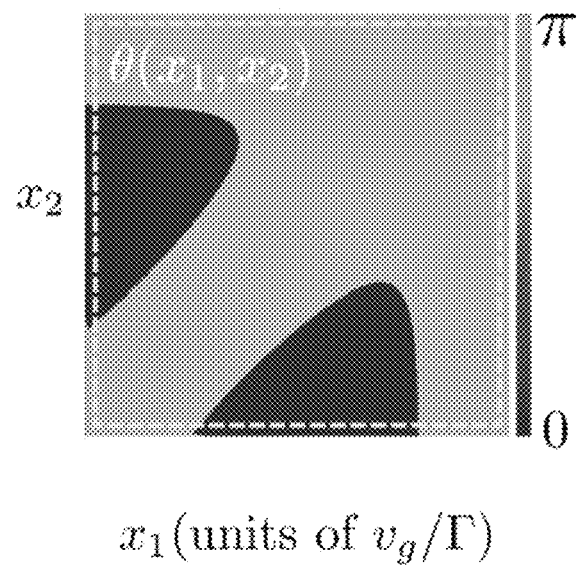
FIG. 10C contains a map of the phase shift of the outgoing two-photon state. Parameters for the scattering processes: $\sigma=1.5vg/\Gamma$ (for instance, if the atomic spontaneous emission time is $1/\Gamma\approx0.1$ ns, the pulse duration is $6\sigma/vg\approx0.9$ ns), and $\gamma=0$.

FIG. 10B plots the two-photon probability density of the scattering process: the probability density of the two-photon Gaussian input is a disk in the third quadrant ($x_1, x_2 < 0$), while the density of the outgoing two-photon state in the first quadrant is concentrated along the diagonal, indicating a bunching behavior and the formation of a photonic dimer. The output state is a linear superposition of both $|W_{\omega_1,\omega_2}\rangle_{w_1 \approx \omega_2}$ and $|B_{2\omega}\rangle$. FIG. 10C plots the two-photon phase shift of the outgoing two-photon state by $\theta(x_1,x_2) = \arg[\phi_{out}(x_1, x_2)/\phi_{ref}(x_1, x_2)]$. Numerically, it is found that the two-photon phase shift takes only discrete values and is either $\pi$ (green region) or 0 (blue regions), for all $x_1$ and $x_2$.

The $\pi$ phase shift is contaminated by the 0 phase shift due to the emergence of the two-photon plane-wave states.

Two-Qubit Controlled-Phase Gate

In various aspects, the 2-qubit controlled-phase gate processes a two-qubit state, $|ij\rangle$ where the first position is the control qubit and the second position is the target qubit with the following truth table

| C | T | C | T |
| --- | --- | --- | --- |
| $|1\rangle$ | $|1\rangle$ | $-|1\rangle$ | $|1\rangle$ |
| $|1\rangle$ | $|0\rangle$ | $|1\rangle$ | $|0\rangle$ |
| $|0\rangle$ | $|1\rangle$ | $|0\rangle$ | $|1\rangle$ |
| $|0\rangle$ | $|0\rangle$ | $|0\rangle$ | $|0\rangle$ |

Our experimental approach to the photonic implementation of this is based on the use of a dipole emitter chirally coupled to photonic qubits in a nanophotonic waveguide. The tight optical confinement in the transverse direction in the nanophotonic waveguide allows us to place the dipole emitter at the chiral point such that the scattered photons couple efficiently to the forward—but not the backward-propagating mode. The photonic qubit states are chosen such that $|0\rangle$ interacts with the dipole emitter while $|1\rangle$ does not. In this system, it has been shown that the $|0\rangle$ photon will pick up a $\pi$ phase shift upon interacting with the dipole emitter, resulting in the following table:

| C | T | C | T |
| --- | --- | --- | --- |
| $|1\rangle$ | $|1\rangle$ | $|1\rangle$ | $|1\rangle$ |
| $|1\rangle$ | $|0\rangle$ | $-|1\rangle$ | $|0\rangle$ |
| $|0\rangle$ | $|1\rangle$ | $-|0\rangle$ | $|1\rangle$ |

Aside from a global phase, the above table can reproduce the controlled phase gate provided the following is also true:

| C | T | C | T |
| --- | --- | --- | --- |
| $|0\rangle$ | $|0\rangle$ | $-|0\rangle$ | $|0\rangle$ |

In various aspects, the architecture of a four-port two-qubit controlled-phase gate is provided as a Mach-Zender interferometer (MZI) with segments of chiral waveguides (FIG. 9) embedded in the central region of each path. A four-port two-qubit controlled-phase gate 100 in one aspect is illustrated schematically in FIG. 11.

Figure 11:
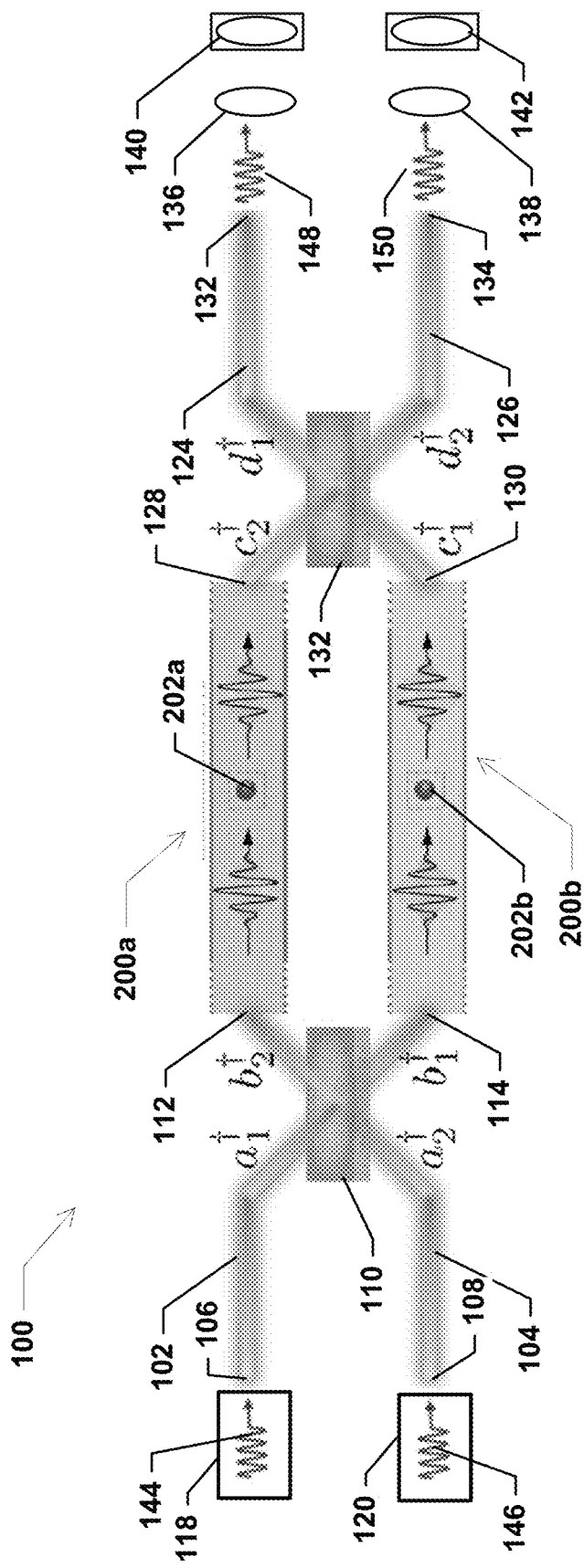
FIG. 11 contains a schematic diagram of a two-photon controlled-phase gate.

Referring to FIG. 11, the four-port two-qubit controlled-phase gate 100 includes a first chiral waveguide 200a and a second chiral waveguide 200b containing chiral atoms 202a and 202b, respectively, as described above. The gate 100 further includes a first input arm 102 operatively coupled to a first qubit source 118 and the first chiral waveguide 200a at opposed first input ends 106 and 112, respectively. Similarly, the gate 100 further includes a second input arm 104 operatively coupled to a second qubit source 120 and the second effective chiral waveguide 200b at opposed second input ends 108 and 114, respectively. A first 50:50 beam combiner 110 is operatively coupled to first and second input arms 102/104 between first and second qubit sources 118/120 and first and second chiral waveguides 200a/200b.

Referring again to FIG. 11, the gate 100 further includes a first output arm 124 operatively coupled to the first chiral waveguide 200a and a first frequency domain modulator 136 at opposed first output ends 128 and 132, respectively. Similarly, the gate 100 further includes a second output arm 126 operatively coupled to the second effective chiral waveguide 200b and a second frequency domain modulator 138 at opposed second output ends 130 and 134, respectively. A second 50:50 beam combiner 132 operatively couples first and second output arms 124/126 between opposed first output ends 128/132 and opposed second output ends 130/134, respectively. First and second frequency domain modulators 136/138 are additionally operatively coupled to first and second photodetectors 140/142, respectively.

In use, first and second input qubits 144/146 are produced by qubit sources 118/120, respectively, and the input qubits 144/146 couple into first and second input ends 106/108 of first and second input arms 102/104. The states of the input qubits 144 and 146 are transformed by the first 50:50 beam combiner 110 before coupling into first and second chiral waveguides 200a and 200b. Within chiral waveguides 200a/200b, input qubits 144/146 either interact with or chiral atoms 202a/202b depending on their states, and input qubits 144/146 are coupled into input ends 128/130 of output arms 124/126. The states of the qubits 144/146 are transformed by the second 50:50 beam combiner 132 before coupling into frequency domain modulators 136/138 and photodetectors 140/142 via output ends 132/134 of output arms 124/126. As described above, the states of output qubits 144/146 either transmit freely through or are phase-shifted by chiral atoms 202a/202b depending on the states of input qubits 144/146 as described herein.

In various aspects, the two-qubit controlled-phase gate performs a conditional phase shift on the input states so that $|x\rangle|y\rangle \rightarrow e^{i\theta_{xy}}|x\rangle|y\rangle$ (x,y=0,1), where $\theta 00+\theta 11 \neq \theta 10+\theta 01$. The unitary transformations of the photonic states in a chiral waveguide provide a mechanism for realizing a controlled-π-phase (control-Z) gate so that $\theta 11=0$, and $\theta 00=\theta 10=\theta 01=\pi$.

In some aspects, the input qubits are frequency-encoded: $|0\rangle$ represents a resonant photon with a frequency $\omega_0 \approx \Omega$, the transition frequency of the chiral atom; while $|1\rangle$ represents an off-resonant photon with a frequency $\omega_1$ such that $|\omega_1 - \Omega| \gg \Gamma, \gamma$. The input ports are coupled by 50:50 couplers, as are the output ports. The couplers transform the optical fields linearly as follows:

$$a_1^\dagger = (b_2^\dagger - b_1^\dagger)/\sqrt{2} \quad \text{Eqn. (10)}$$

$$a_2^\dagger = \frac{b_2^\dagger + b_1^\dagger}{\sqrt{2}} \quad \text{Eqn. (11)}$$

$$c_1^\dagger = \frac{a_4^\dagger - a_3^\dagger}{\sqrt{2}} \quad \text{Eqn. (12)}$$

$$c_2^\dagger = (a_4^\dagger + a_3^\dagger)/\sqrt{2} \quad \text{Eqn. (13)}$$

We note that a typical commercially available coupler has a wide working bandwidth of ≈100 nm at telecommunication bands so that the couplers are suitable for use with both qubits. Two independent photonic qubits are fed into the input ports. We now describe the gate operation by explicitly enumerating the mapping of the four input states.

1. $|1\rangle_{a_1}|1\rangle_{a_2} \rightarrow |1\rangle_{a_3}|1\rangle_{a_4}$. The input state consists of one off-resonant photon $|1\rangle$ in each input port: $|\text{in}\rangle = |1\rangle_{a_1}|1\rangle_{a_2} = a_{1,\omega_1}^\dagger a_{2,\omega_1}^\dagger |\phi\rangle$, where $|\phi\rangle$ is photonic vacuum state. After the coupler, the state transforms into $\frac{1}{2}(b_{2,\omega_1}^{\dagger 2} - b_{1,\omega_1}^{\dagger 2})|\phi\rangle$. The off-resonant photons transmit through the chiral atoms freely so that $b_{1,\omega_1}^\dagger \rightarrow c_{1,\omega_1}^\dagger$, $b_{2,\omega_1}^\dagger \rightarrow c_{2,\omega_1}^\dagger$ and the out-state is $$|\text{out}\rangle = \tfrac{1}{2}(c_{2,\omega_1}^{\dagger 2} - c_{1,\omega_1}^{\dagger 2})|\phi\rangle = a_{3,\omega_1}^\dagger a_{4,\omega_1}^\dagger |\phi\rangle = |1\rangle_{a_3}|1\rangle_{a_4} \quad \text{Eqn. (14)}$$

2. $|0\rangle_{a_1}|1\rangle_{a_2} \rightarrow -|0\rangle_{a_3}|1\rangle_{a_4}$. The input state consists of one resonant photon $|0\rangle$ in the control port and one off-resonant photon $|1\rangle$ in the target port: $|\text{in}\rangle = |0\rangle_{a_1}|1\rangle_{a_2} = a_{1,\omega_0}^\dagger a_{2,\omega_1}^\dagger |\phi\rangle$. After the coupler, the state transforms into $\frac{1}{2}(b_{2,\omega_0}^\dagger - b_{1,\omega_0}^\dagger)(b_{2,\omega_1}^\dagger + b_{1,\omega_1}^\dagger)|\phi\rangle$. The $|1\rangle$ qubit again transforms trivially; in contrast, for the $|0\rangle$ qubit, due to the π phase shift through the chiral atom, the photonic field transforms as $b_{1,\omega_0}^\dagger \rightarrow -c_{1,\omega_0}^\dagger$, $b_{2,\omega_0}^\dagger \rightarrow -c_{2,\omega_0}^\dagger$, and the output is:

$$|\text{out}\rangle = -\frac{1}{2}(c_{2,\omega_0}^\dagger - c_{1,\omega_0}^\dagger)(c_{2,\omega_1}^\dagger - c_{1,\omega_1}^\dagger)|\phi\rangle \quad \text{Eqn. (15)}$$
$$= -a_{3,\omega_0}^\dagger a_{4,\omega_1}^\dagger |\phi\rangle = -|0\rangle_{a_3}|1\rangle_{a_4}$$

3. Similarly $|1\rangle_{a_1}|0\rangle_{a_2} \rightarrow -|1\rangle_{a_3}|0\rangle_{a_4}$.

4. $|0\rangle_{a_1}|0\rangle_{a_2} \rightarrow -|0\rangle_{a_3}|0\rangle_{a_4}$. The input has one resonant photon in each port: $|\text{in}\rangle = |0\rangle_{a_1}|0\rangle_{a_2} = a_{1,\omega_0}^\dagger a_{2,\omega_0}^\dagger |\phi\rangle$. After the coupler, the state turns into $\frac{1}{2}(b_{2,\omega_0}^{\dagger 2} - b_{1,\omega_0}^{\dagger 2})|0\rangle$, which is a linear superposition of Fock states in the arms, each containing two resonant photons. The uncorrelated two-photon Fock states can be decomposed by the complete set of bases $|B_{2\omega}\rangle$ and $|W_{\omega_1,\omega_2}\rangle$. The two photons in the $|B_{2\omega}\rangle$ state acquire a π phase shift collectively, thus $b_{1,\omega_0}^{\dagger 2} \rightarrow c_{1,\omega_0}^{\dagger 2}$, $b_{2,\omega_0}^{\dagger 2} \rightarrow c_{2,\omega_0}^{\dagger 2}$, giving to the out-state a contribution with a desired π phase shift:

$$-\tfrac{1}{2}(c_{2,\omega_0}^{\dagger 2} - c_{1,\omega_0}^{\dagger 2})|\phi\rangle = a_{3,\omega_0}^\dagger a_{4,\omega_0}^\dagger |\phi\rangle = -|0\rangle_{a_3}|0\rangle_{a_4} \quad \text{Eqn. (16)}$$

In contrast, the two photons in the $|W_{\omega,\omega}\rangle$ acquire an unwanted 0 phase shift collectively (π+π mod 2π).

Thus, the transformation of the four orthogonal bases $|00\rangle$, $|01\rangle$, $|10\rangle$, and $|11\rangle$ constitutes the two-photon controlled-phase gate operation subject to a trivial global phase π. Such a global phase can be readily rectified by adding one wide-bandwidth π/2 phase shifter on each arm.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Any publications, patents, patent applications, and other references cited in this application are incorporated herein by reference in their entirety for all purposes to the same extent as if each individual publication, patent, patent application, or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following examples illustrate various aspects of the disclosure.

Example 1

Average Gate Fidelity

To characterize the similarity between the experimentally implemented quantum logic gate in a particular model and the ideal gate, we numerically compute the average gate fidelity as follows:

$$\overline{F} = \overline{\langle \mathcal{X}_{in} | \hat{U}^\dagger_{ideal} \rho_{out} \hat{U}_{ideal} | \mathcal{X}_{in} \rangle} \quad \text{Eqn. (34)}$$

where the overline denotes the average over all possible input states $|\mathcal{X}_{in}\rangle$, and $\hat{U}_{ideal}$ is the unitary operator corresponding to the ideal gate.

For the two-photon controlled-phase gate, for an in-state $|\mathcal{X}_{in}\rangle = u_{00}|00\rangle + u_{01}|01\rangle + u_{10}|10\rangle + u_{11}|11\rangle$, the out-states for the implemented gate and the ideal gate are respectively given by $$|\mathcal{X}_{out}\rangle = u_{00}t_2 e^{i\theta_2}|00\rangle + u_{01}t_1 e^{i\theta_1}|01\rangle + u_{10}t_1 e^{i\theta_1}|10\rangle + u_{11}|11\rangle \quad \text{Eqn. (35)}$$

$$\hat{U}_{ideal}|\mathcal{X}_{in}\rangle = u_{00}|00\rangle + u_{01}|01\rangle + u_{10}|10\rangle - u_{11}|11\rangle \quad \text{Eqn. (36)}$$

where single- and two-photon quantum processes are denoted by $b_{i,\omega_0}^\dagger \to t_1 e^{i\theta_1} c_{i,\omega_0}^\dagger$ and $b_{i,\omega_0}^\dagger b_{i,\omega_0}^\dagger \to t_2 e^{i\theta_2} c_{i,\omega_0}^\dagger c_{i,\omega_0}^\dagger$, respectively.

The transmission amplitudes $t_i$ and the phase shifts $\theta_i$ are averaged over the positive x-axis (for i=1) or the first quadrant (for i=2). For example, $t_2 = \sqrt{\iint |\varnothing_{out}(x_1, x_2)|^2 dx_1 dx_2}$, and $$\theta_2 = \frac{\iint dx_1 dx_2 \theta(x_1, x_2) |\varnothing_{out}(x_1, x_2)|^2}{\iint dx_1 dx_2 |\varnothing_{out}(x_1, x_2)|^2}.$$

It can be shown that the average gate fidelity is reduced to $$\overline{F} = \overline{\left| |u_{00}|^2 t_2 e^{i\theta_2} + (|u_{01}|^2 + |u_{10}|^2) t_1 e^{i\theta_1} + |u_{11}|^2 \right|^2} \quad \text{Eqn. (37)}$$

Quantum state tomography of frequency-encoded qubits: By performing $\sigma_x$ operations in frequency space and performing a coincidence measurement, the signal intensity is proportional to the projection of density matrix $\rho_{out}$ onto a combined measurement basis $\sigma_x \oplus \sigma_x$:

coincidence signal $\propto \frac{1}{4} Tr[\rho_{out} \sigma_\chi \oplus \sigma_\chi] = \frac{1}{4} [u_{00} u^*_{11} t_2 e^{i\theta_2} + u_{01} u^*_{10} t_1^2 + u^*_{01} u_{10} t_1^2 + u_{11} u^*_{10} t_1 e^{-i\theta_1}]$ Eqn. (38)

In-state average: Following the standard approach, the in-state average is performed through a random sampling approach on the two-qubit hyper-Bloch sphere, by parametrization the two-photon in-state on a six-dimensional manifold as $u_{00}=\cos\alpha_1$, $u_{01}=\sin\alpha_1\cos\alpha_2\,e^{i\phi_2}$, $u_{10}=\sin\alpha_1\sin\alpha_2\cos\alpha_3\,e^{i\phi_2}$, and $u_{11}=\sin\alpha_1\sin\alpha_2\sin\alpha_3\,e^{i\phi_3}$. We uniformly sample N points on the six-dimensional numerical mesh $\{\alpha_i,\phi_j\}$, and calculate the average fidelity using all possible $N^6$ combinations. Numerically, it is found that the relative error of F̄ for N=15 and N=25 is smaller than <0.5% for typical values of $\sigma\Gamma/v_g$, indicating that the numerical convergence of the values of the fidelity; hereafter we will take N=15 for further numerical investigations.

Figure 6A:
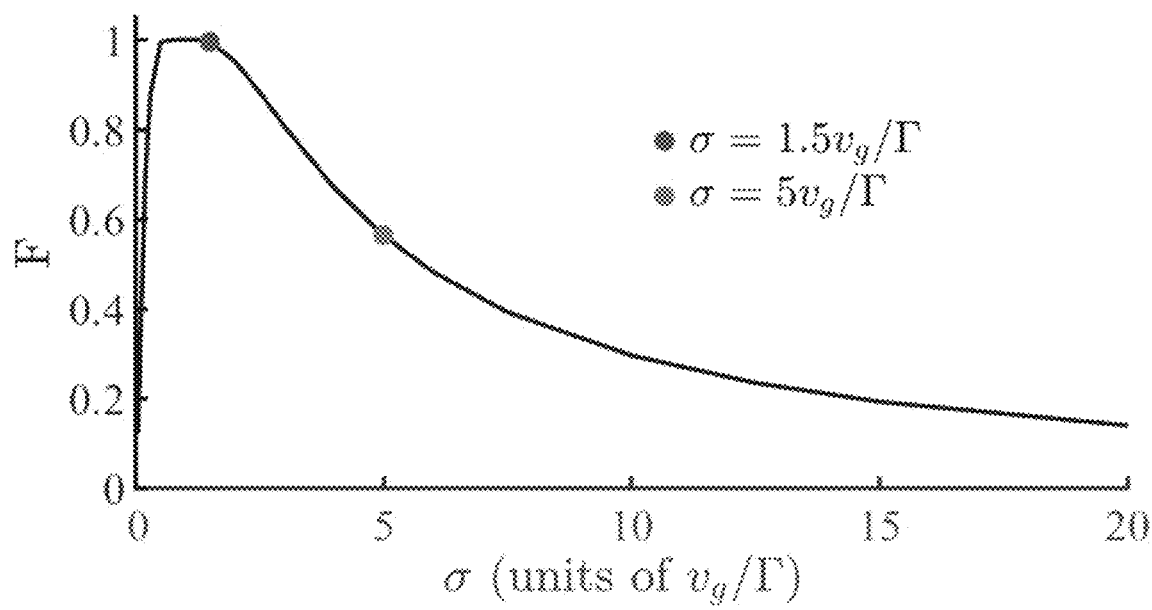
FIG. 6A contains a graph summarizing numerical results of fidelity F as a function of $\sigma$ for an incoming two-photon Gaussian pulse in the ideal case ($\delta=0$, $\gamma=0$).
Figure 12A:
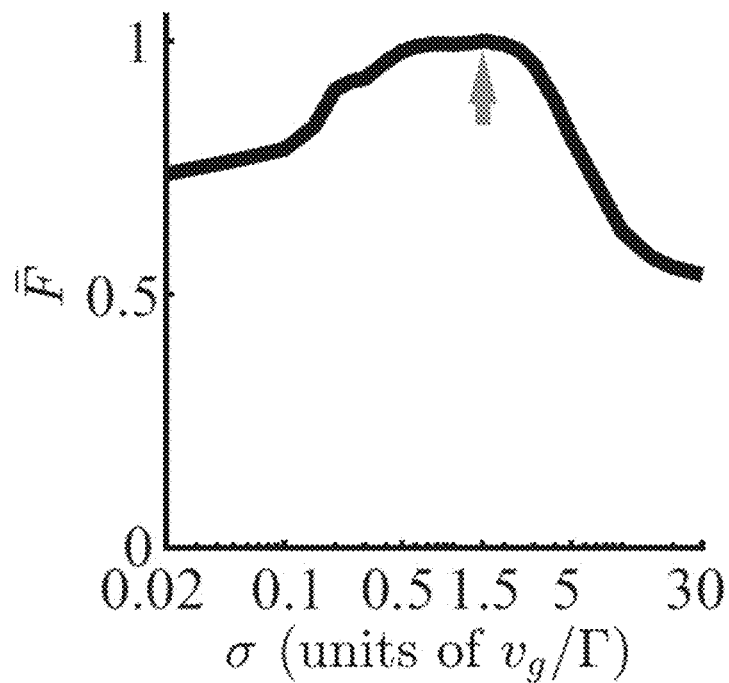
FIG. 12A contains a graph of the numerical results of average gate fidelity $\bar{F}$ as a function of photon pulse width $\sigma$ in the absence of atomic dissipation $\gamma=0$.
Figure 12B:
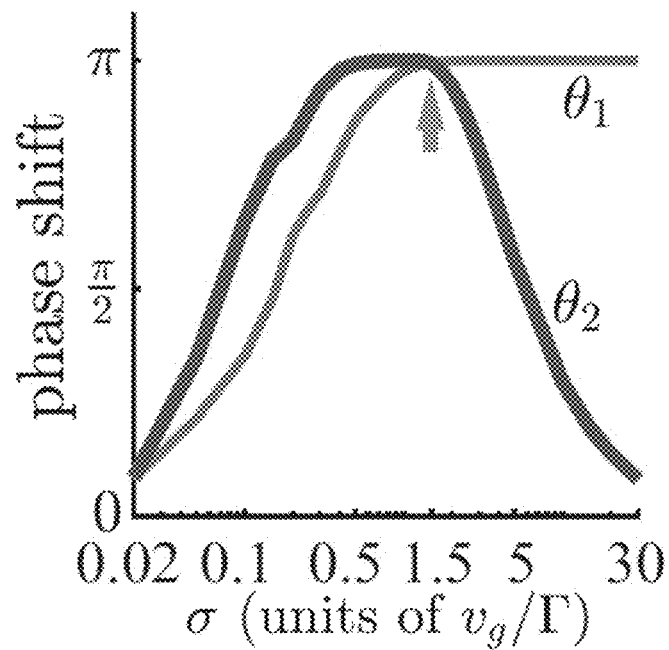
FIG. 12B contains a graph of the numerical results comparing the single-photon phase shift $\theta 1$ and the photonic molecule phase shift $\theta 2$ as a function of photon pulse width $\sigma$ in the absence of atomic dissipation $\gamma=0$.

Effects of pulse duration and bandwidth: FIG. 12A and FIG. 6A contain graphs summarizing the fidelity F̄ as a function of the pulse width σ. For small values of σ, the frequency bandwidth is large so that the off-resonant frequency components degrade the fidelity, even though the center frequency $k_0v_g$ is on-resonance. For large values of σ, we found numerically that the weight of the two photon plane waves in the output state also increases, which also degrades the fidelity. High fidelity F̄>0.99 can be achieved when $\sigma\Gamma/v_g$ (the extension of the pulse expressed in the units of spontaneous emission length scale) is in the intermediate range between 0.6 to 2.5. FIG. 12B plots the phase shift for varying pulse width σ. For large σ (thus narrow frequency band), the single-photon phase shift (blue curve) is π, as expected. The qualitative behavior of the two-photon phase shift $\theta_2$ follows that of the fidelity for the same physical reasons and $\theta_2$ approaches π for the same range of σ. At the optimal pulse duration $\sigma\Gamma/v_g\approx1.5$, $\theta_1=1.00\pi$, $\theta_2=0.99\pi$, and F̄=99.95%.

Figure 6B:
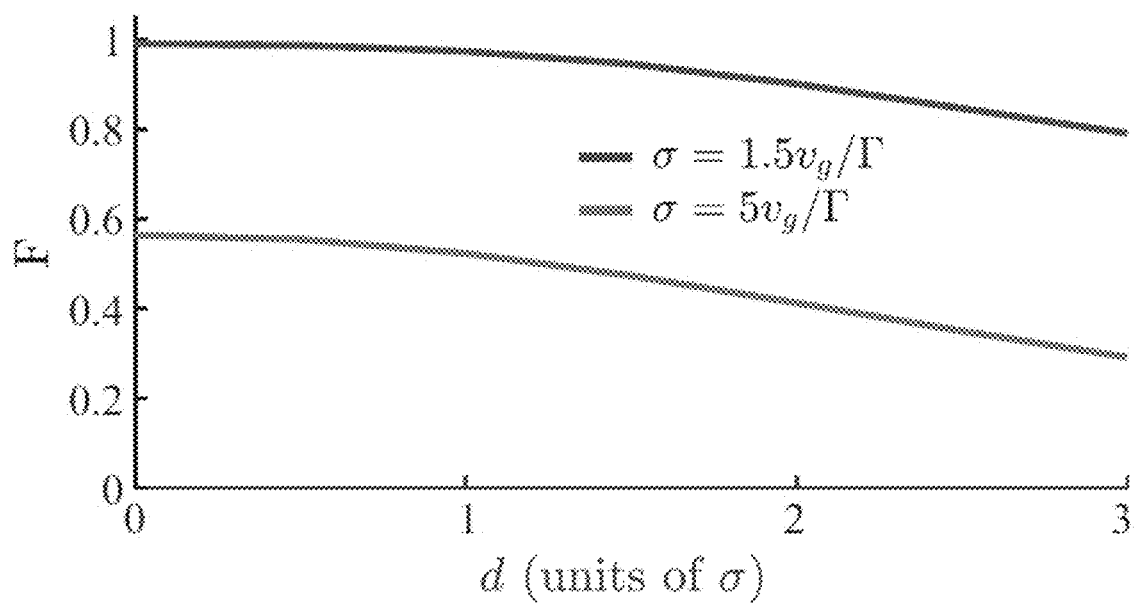
FIG. 6B contains a graph summarizing numerical results of fidelity F as a function of two-photon offset d for an incoming two-photon Gaussian pulse in the ideal case ($\delta=0$, $\gamma=0$).
Figure 7:
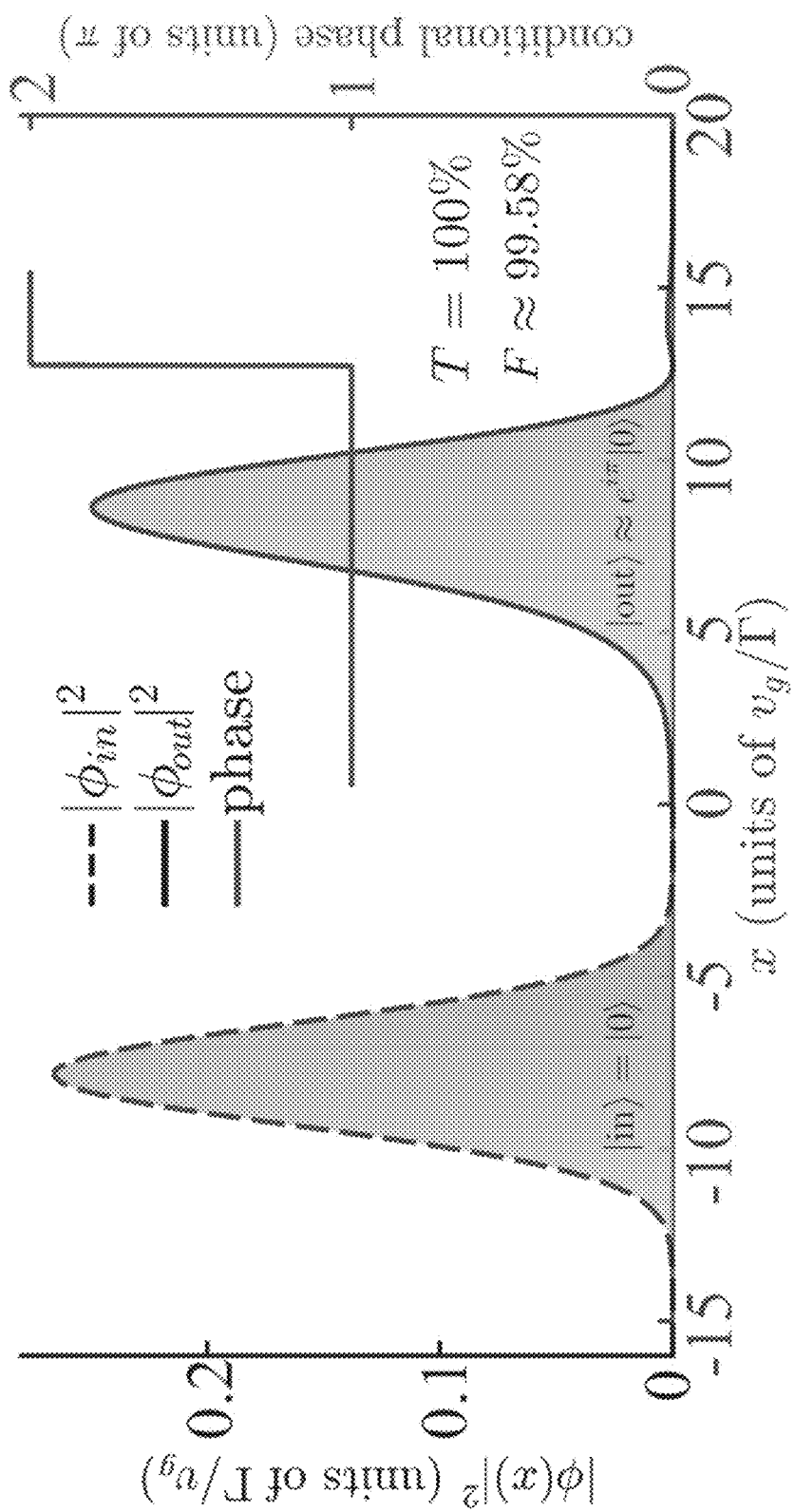
FIG. 7 contains a graph comparing two-photon Gaussian pulses before and after transmission through the chiral atom emitter for the ideal case ($\delta=0$, $\gamma=0$) when $\sigma=1.5vg/\Gamma$.
Figure 8A:
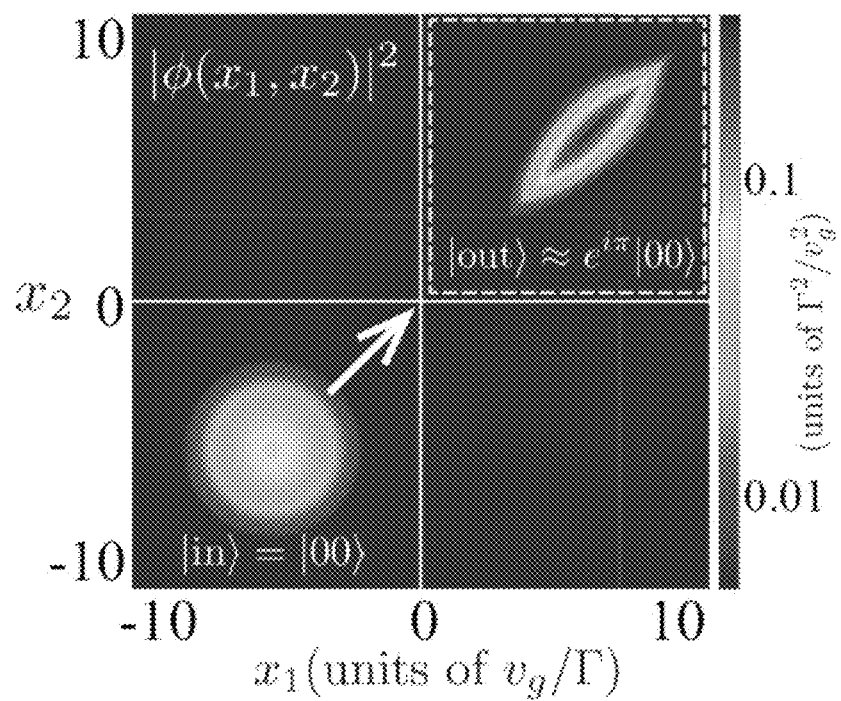
FIG. 8A contains a map of numerical results comparing the input and output states of qubits 1 and 2 before and after the formation of a photonic molecule by the chiral atom emitter for the ideal case ($\delta=0$, $\gamma=0$) when $\sigma=1.5$ vg/$\Gamma$.
Figure 8B:
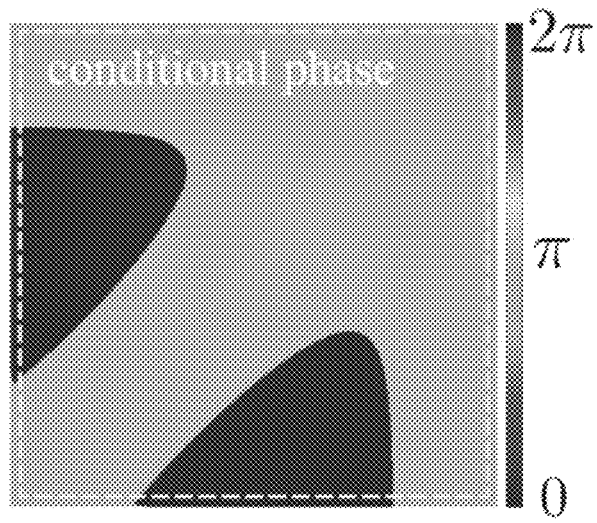
FIG. 8B contains a phase shift map of the outgoing two-photon state corresponding to the map of FIG. 8A.

The effect of offset d on fidelity was investigated by scanning d in the range of [0; 3σ] in the ideal case (δ=0, γ=0) for long ($\sigma=5v_g/\Gamma$) and middle ($\sigma=1.5v_g/\Gamma$) Gaussian pulses. FIG. 6B plots the fidelity as a function of d for both pulses. Fidelity monotonically decreases when d increases due to an increasing off-diagonal plane-wave component contribution. In addition, the middle pulse preserves an advantage of high fidelity even in the presence of d. In particular, when d=3σ, F̄≈79.19% for the middle Gaussian pulse while F̄≈29.18% for the long Gaussian pulse.

Figure 12C:
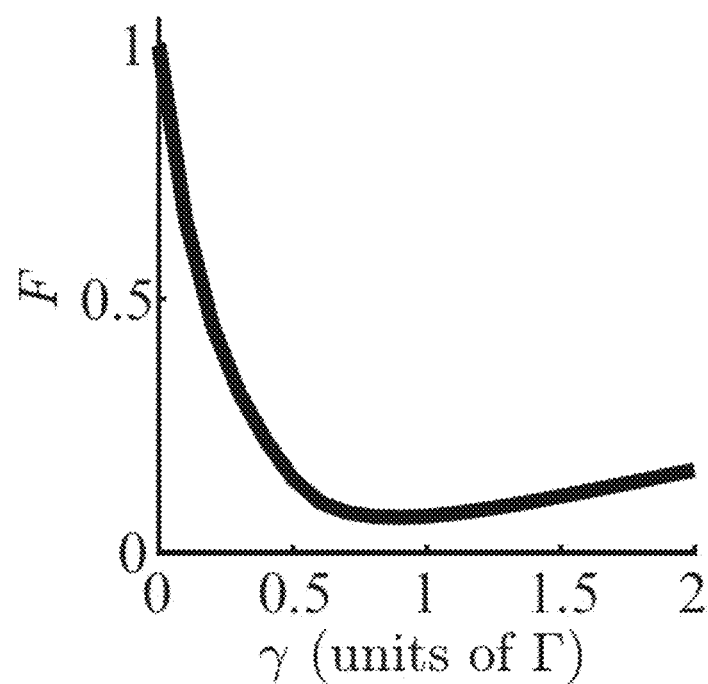
FIG. 12C contains a graph of the numerical results of average gate fidelity $\bar{F}$ as a function of atomic dissipation $\gamma$ at $\sigma\Gamma/vg=1.5$.
Figure 12D:
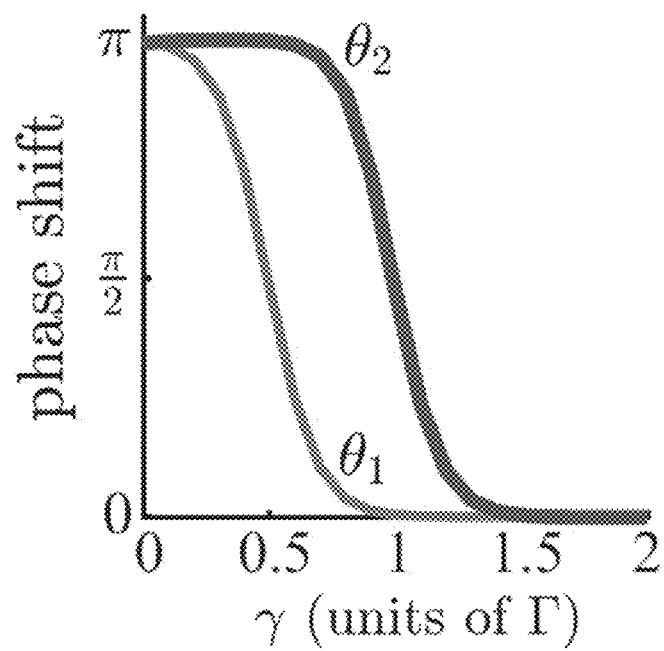
FIG. 12D contains a graph of the numerical results of phase shift $\theta 1$, $\theta 2$ as a function of atomic dissipation $\gamma$ at $\sigma\Gamma/vg=1.5$.

Effects of dissipation: Here we study the effects of atomic dissipation γ at the optimal pulse duration $\sigma\Gamma/v_g$=1.5. As plotted in FIG. 12C, as γ increases, F̄ drops gradually and reaches the minimum at around γ=0.5Γ, at which the phase shift $\theta_1$ for an on-resonant photon has a jump from π to 0 (see Eqn. (3)), as shown in FIG. 12D. The drop is not abrupt as the photons are not monochromatic but have a finite-bandwidth. F̄ remains low when γ>Γ as the two-photon phase shift $\theta_2$ has a jump at γ=Γ (see Eqn. (4)), as shown in FIG. 12D (red curve). Finally, when γ≫Γ, F̄→¼, as at large dissipation limit, only the trivial mapping |11⟩→|11⟩ that involves off-resonant photons survives.

Example 2

Computational Simulation of Strongly Correlated Photon Transport

In addition to the analytical methods, we will also undertake complementary computational approaches that are independent of the analytical approach, which provide invaluable insights and capabilities otherwise not possible. In the past few years, the Shen group has developed highly efficient computational schemes (complexity of $o(N\log N)$, where N is the dimension of the Hamiltonian matrix) for quantitative investigation of the strongly correlated photon transport in quantum nanophotonics. The equations of motion are evolved numerically in time to trace out the full spatiotemporal dynamics of the scattering process, to which end we have developed efficient pseudospectral codes. Our computational capability enables the numerical investigation of the key metrics of importance, including the fidelity F, the nonlinear two-photon transmission T, and the conditional phase shift; and also the changes of these quantities when other physical parameters (e.g., frequency detuning δ, pulse width σ, and dissipation γ) are varied.

$$F \equiv |\langle B_E|\text{out}\rangle|^2 = \frac{\int\int_{dimer} dx_1 dx_2 |\emptyset_{out}(x_1,x_2)|^2}{\int\int dx_1 dx_2 |\emptyset_{out}(x_1,x_2)|^2}, \quad \text{Eqn. (39)}$$

$$T = \int\int dx_1 dx_2 |\emptyset_{out}(x_1,x_2)|^2$$

where $\emptyset_{out}(x_1, x_2)$ is the two-photon output state.

Figure 5A:
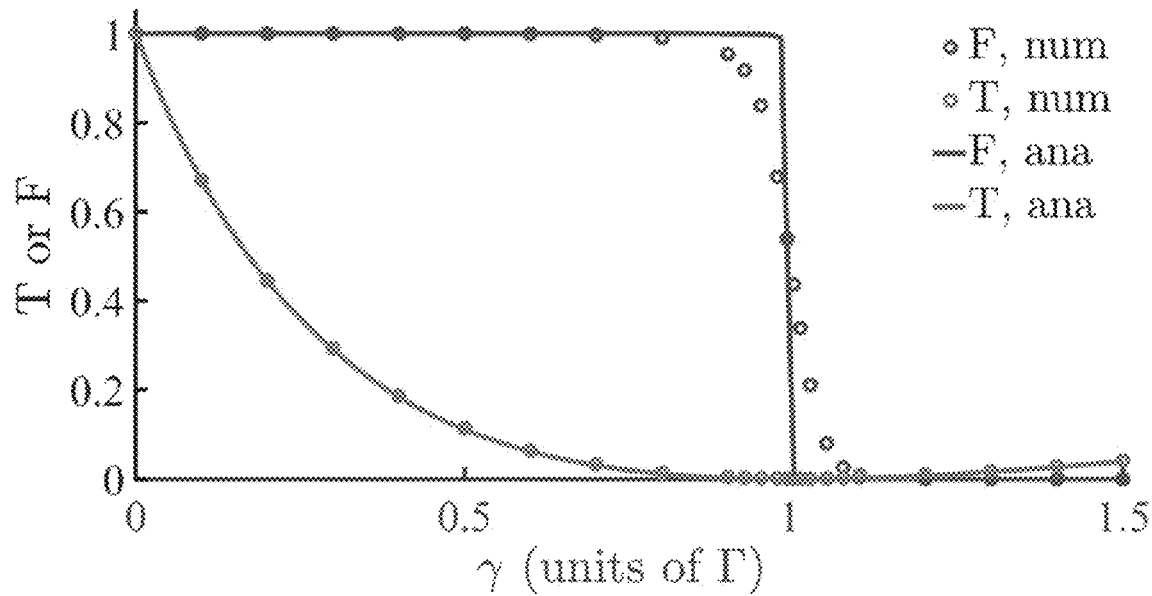
FIG. 5A contains a graph summarizing analytical and numerical results of fidelity F and two-photon transmission T as a function of $\gamma$ for resonant incoming photons of a two-photon bound state; $\sigma\Gamma/vg=5$, $\delta=0$, and photon-photon correlation time $\tau=1/\Gamma$.
Figure 5B:
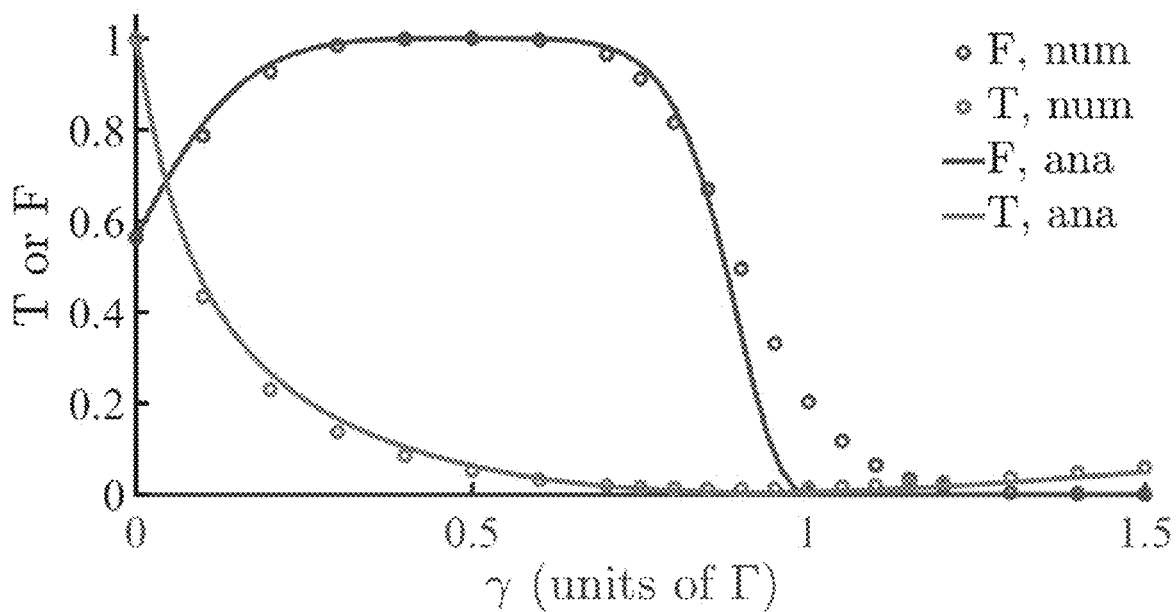
FIG. 5B contains a graph summarizing analytical and numerical results of fidelity F and two-photon transmission T as a function of $\gamma$ for resonant incoming photons of a two-photon long Gaussian pulse; $\sigma\Gamma/vg=5$, $\delta=0$, and photon-photon correlation time $\tau=1/\Gamma$.
Figure 14A:
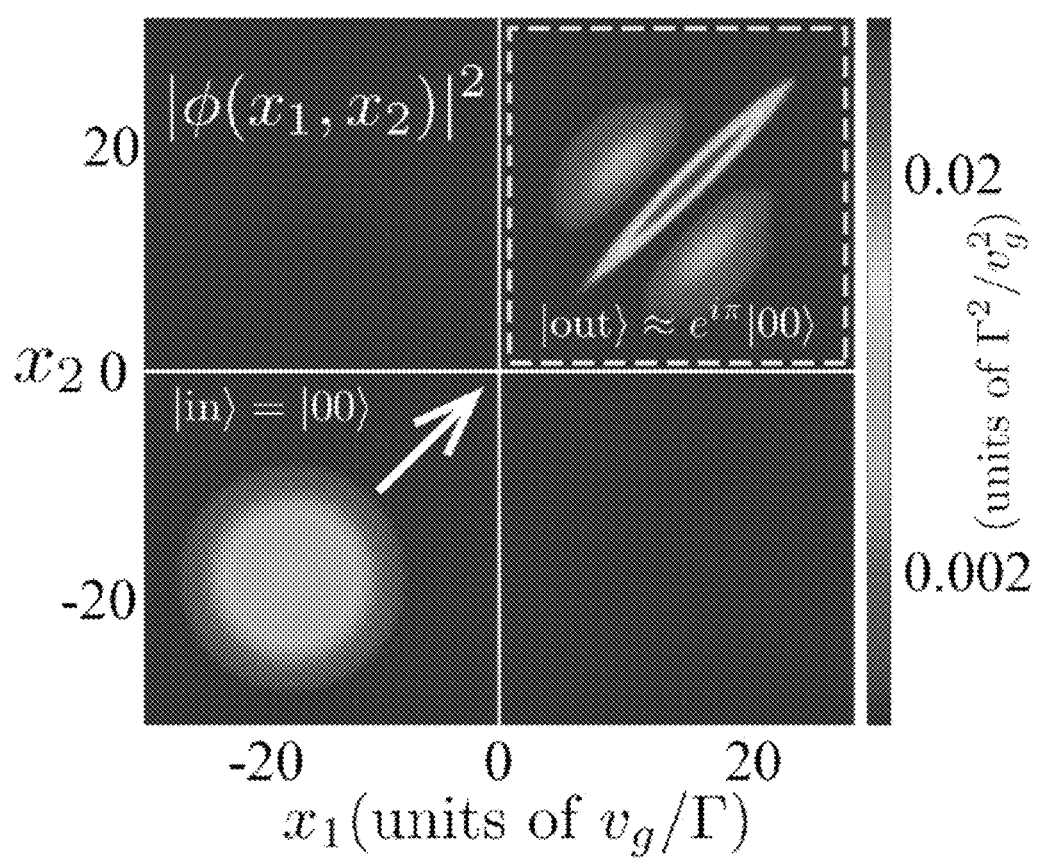
FIG. 14A contains a probability density plot of the input and output states during the formation of a photonic dimer via a Fock state interacting with a quantum dot (located at the origin x1=x2=0) in a chiral waveguide; x1 and x2 are the locations of the photons.
Figure 14B:
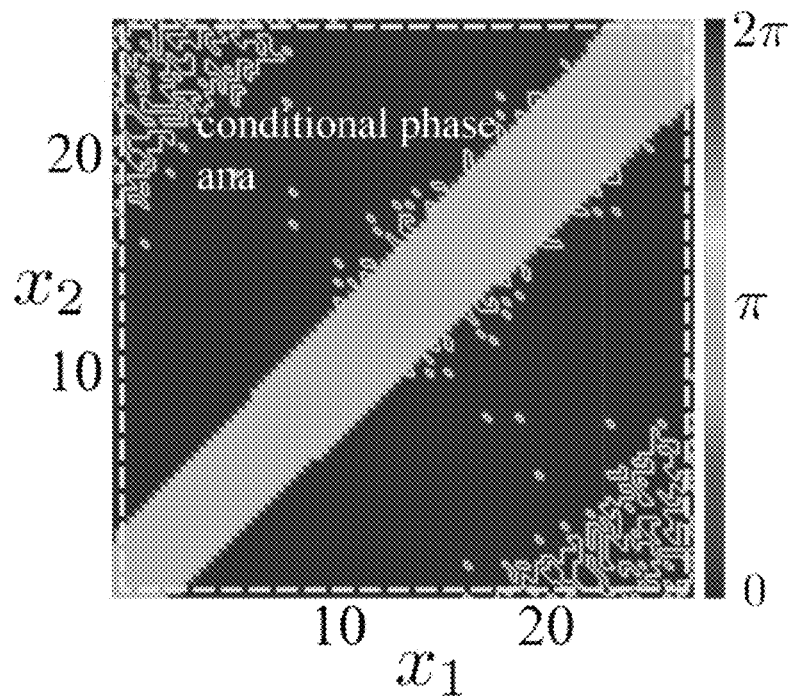
FIG. 14B contains a map showing the analytical results of the conditional phase for the output state of FIG. 14A. The dimer along the diagonal has a π phase shift. The speckles are numerical noises due to the jumps at the discontinuities from 2π+ to 0−
Figure 14C:
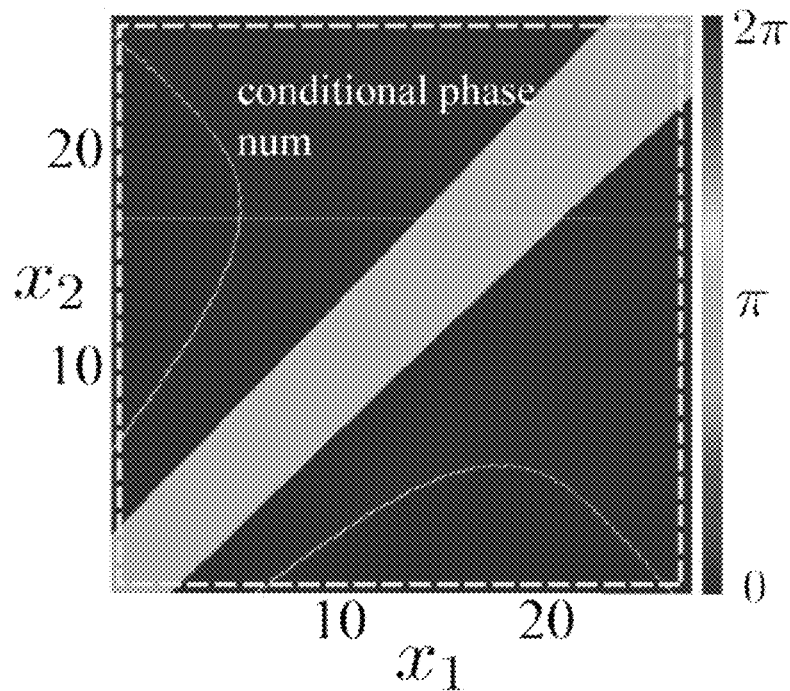
FIG. 14C contains a map showing numerical results of the conditional phase for the output state of FIG. 14A with conditions σΓ/vg=5, δ=γ=0.

FIGS. 14A, 14B, and 14C contain a series of maps of the scattering process of an uncorrelated two-photon Fock state by a quantum dot in an effective chiral waveguide. FIGS. 5A and 5B contain graphs summarizing the fidelity F and the nonlinear two-photon transmission T for varying atomic dissipation γ for resonant incoming photons of a two-photon bound state and a two-photon long Gaussian pulse, respectively. FIGS. 6A and 6B contain graphs summarizing the fidelity as a function of the Gaussian pulse width σ (FIG. 6A) and as a function of the temporal/spatial difference between two incident photons d (FIG. 6B). The numerical results show that for a resonant two-photon Gaussian pulse with a spatial with $\sigma=1.5v_g/\Gamma$ and γ=0, F↑ 99.38% and T↑ 100%, suggesting a high-fidelity, high-generation-efficiency two-photon controlled-phase gate. The process is also robust: F and T remain large≳80% for γ≲1.5Γ.

What is claimed is:

1. A photonic controlled-phase gate comprising a dipole emitter chirally coupled to a plurality of photonic qubit pairs in a photonic crystal waveguide, each photonic qubit pair comprising a two-qubit state |xy⟩, wherein:
   a. the two-qubit state |xy⟩ comprises a combination of single-qubit states |0⟩ and |1⟩, the state selected from the group consisting of |00⟩, |01⟩, |10⟩, and |11⟩;
   b. the dipole emitter is configured to interact with the single-qubit state |0⟩ to impose a π phase shift; and
   c. the dipole emitter interacts with states |00⟩, |01⟩, and |10⟩ to impose the π phase shift;
      wherein the photonic crystal waveguide comprises a glide plane structure and the dipole emitter is positioned at a chiral point of the photonic crystal waveguide.

2. The gate of claim 1, wherein the dipole emitter is selected from a Rydberg atom, a quantum dot, a superconducting qubit, and an N-V defect state in a single-walled carbon nanotubes.

3. The gate of claim 2, wherein the quantum dot is an InGaAs quantum dot.

4. The gate of claim 3, wherein the dipole emitter is a circularly polarized dipole emitter chirally coupled to a circularly polarized electric field of the photonic crystal waveguide, wherein:
   a. the single-qubit state |0⟩ comprises a photon with helicity $\sigma_+$ and transition frequency $\omega_+$ and the single-qubit state $|1\rangle$ comprises a photon with helicity $\sigma_-$ and transition frequency $\omega_+$; or b. the single-qubit state $|0\rangle$ comprises a photon with helicity $\sigma_+$ and transition frequency $\omega_+$ and the single-qubit state $|1\rangle$ comprises a photon with helicity $\sigma_+$ and transition frequency $\omega_-$.

5. The gate of claim 3, wherein the dipole emitter is a horizontally linearly-polarized dipole emitter coupled to a horizontal/vertical linearly-polarized electric field of the chiral waveguide, wherein:

a. the single-qubit state $|0\rangle$ comprises a horizontally-polarized photon with transition frequency $\omega_+$ and the single-qubit state $|1\rangle$ comprises a vertically-polarized photon with transition frequency $\omega_+$; or b. the dipole emitter comprises a horizontally linearly-polarized dipole emitter coupled to a horizontal/vertical linearly-polarized electric field of the chiral waveguide, the single-qubit state $|0\rangle$ comprises a horizontally-polarized photon with transition frequency $\omega_+$ and the single-qubit state $|1\rangle$ comprises a horizontally-polarized photon with transition frequency $\omega_-$.

6. The gate of claim 1, wherein the dipole emitter interacts with state $|00\rangle$ to form a photonic dimer.

7. A two-qubit photonic controlled-phase gate device, comprising a first and second chiral waveguide, each chiral waveguide containing first and second dipole emitters, respectively, wherein:

a. the first chiral waveguide is operatively coupled at opposite ends to a first input waveguide and a first output waveguide and the second chiral waveguide is operatively coupled at opposite ends to a second input waveguide and a second output waveguide;

b. the first input waveguide is operatively coupled to a first qubit source and the second input waveguide is operatively coupled to a second qubit source;

c. the first input waveguide and the second input waveguide are operatively coupled to an input beam combiner positioned between the first and second qubit sources and the first and second chiral waveguides;

d. the first output waveguide and the second output waveguides are further operatively coupled to first and second frequency domain modulators and first and second photodetectors at ends opposite the first and second chiral waveguides, respectively; and e. the first and second dipole emitters are chirally coupled to a plurality of photonic qubit pairs produced by the first and second qubit sources, respectively, each photonic qubit pair comprising a two-qubit state $|xy\rangle$, wherein:

i. each two-qubit state $|xy\rangle$ comprises a combination of single-qubit states $|0\rangle$ and $|1\rangle$, the state selected from the group consisting of $|00\rangle$, $|01\rangle$, $|10\rangle$, and $|11\rangle$;

ii. the dipole emitter is configured to interact with each single-qubit state $|0\rangle$ to impose a $\pi$ phase shift; and iii. the dipole emitter interacts with states $|00\rangle$, $|01\rangle$, and $|10\rangle$ to impose the $\pi$ phase shift.

8. The gate of claim 7, wherein the first and second chiral waveguides are selected from a photonic crystal waveguide, a nanobeam waveguide, and a chiral waveguide.

9. The gate of claim 8, wherein the photonic crystal waveguide comprises a glide plane structure and the dipole emitter is positioned at a chiral point of the photonic crystal waveguide.

10. The gate of claim 9, wherein the dipole emitter is selected from a Rydberg atom, a quantum dot, a superconducting qubit, and an N-V defect state in a single-walled carbon nanotubes.

11. The gate of claim 10, wherein the quantum dot is an InGaAs quantum dot.

12. The gate of claim 11, wherein the dipole emitter is a circularly polarized dipole emitter chirally coupled to a circularly polarized electric field of the photonic crystal waveguide, wherein:

a. the single-qubit state $|0\rangle$ comprises a photon with helicity $\sigma_+$ and transition frequency $\omega_+$ and the single-qubit state $|1\rangle$ comprises a photon with helicity $\sigma_-$ and transition frequency $\omega_+$; or b. the single-qubit state $|0\rangle$ comprises a photon with helicity $\sigma_+$ and transition frequency $\omega_+$ and the single-qubit state $|1\rangle$ comprises a photon with helicity $\sigma_+$ and transition frequency $\omega_-$.

13. The gate of claim 11, wherein the dipole emitter is a horizontally linearly-polarized dipole emitter coupled to a horizontal/vertical linearly-polarized electric field of the chiral waveguide, wherein:

a. the single-qubit state $|0\rangle$ comprises a horizontally-polarized photon with transition frequency $\omega_+$ and the single-qubit state $|1\rangle$ comprises a vertically-polarized photon with transition frequency $\omega_+$; or b. the dipole emitter is a horizontally linearly-polarized dipole emitter coupled to a horizontal/vertical linearly-polarized electric field of the chiral waveguide, the single-qubit state $|0\rangle$ comprises a horizontally-polarized photon with transition frequency $\omega_+$ and the single-qubit state $|1\rangle$ comprises a horizontally-polarized photon with transition frequency $\omega_-$.

14. The gate of claim 7, wherein the dipole emitter interacts with state $|00\rangle$ to form a photonic dimer.

15. The gate of claim 7, wherein at least one of the first and second photodetectors comprises a superconducting wire detector, the superconducting wire detector configured to specifically detect photonic qubit pairs with the two-qubit state $|00\rangle$.

16. A two-qubit photonic controlled-phase gate device comprising:

a. a first waveguide comprising a first input port, a first exit port, and a first controlled-phase gate optically coupled to the first waveguide between the first input port and the first exit port; and b. a second waveguide comprising a second input port, a second exit port, and a second controlled-phase gate optically coupled to the second waveguide between the second input port and the second exit port, wherein:

i. the first and second input ports are configured to receive a first and second photonic qubit, each photonic qubit comprising one of single-qubit states $|0\rangle$ and $|1\rangle$;

ii. the first and second input ports are optically coupled by a first 50:50 coupler and the first and second exit ports are optically coupled by a second 50:50 coupler;

iii. the first 50:50 coupler is configured to transform the single-qubit states of the first and second photonic qubits to produce first and second two-qubit states selected from $|00\rangle$, $|01\rangle$, $|10\rangle$, and $|11\rangle$;

iv. each of the first and second controlled-phase gates comprises a dipole emitter chirally coupled to the plurality of photonic qubits in a gate waveguide, the dipole emitter configured to interact with the single-qubit state $|0\rangle$; and v. each dipole emitter interacts with two-qubit states $|00\rangle$, $|01\rangle$, and $|10\rangle$ to impose a $\pi$ phase shift.

17. The gate device of claim 16, wherein the single-qubit states of the first and second photonic qubits entering the first and second input ports respectively are transformed into third and fourth photonic qubits exiting the first and second exit ports with single-qubit states as expressed in the table:

| First/Second Input Ports | First/Second Exit Ports |
|---|---|
| $\|1\rangle\|1\rangle$ | $\|1\rangle\|1\rangle$ |
| $\|0\rangle\|1\rangle$ | $-\|0\rangle\|1\rangle$ |
| $\|1\rangle\|0\rangle$ | $-\|1\rangle\|0\rangle$ |
| $\|0\rangle\|0\rangle$ | $-\|0\rangle\|0\rangle$ | wherein a (−) sign denotes the $\pi$ phase shift.

* * * * *